(12) United States Patent
Jackson et al.

(10) Patent No.: US 7,236,966 B1
(45) Date of Patent: Jun. 26, 2007

(54) METHOD AND SYSTEM FOR PROVIDING A USER-CUSTOMIZED ELECTRONIC BOOK

(75) Inventors: Benjamin T. Jackson, San Jose, CA (US); Bryan R. K. Cross, Pioneer, CA (US); Susan C. Cross, Oak Park, CA (US)

(73) Assignee: Cisco Technology, San Jose, CA (US)

( * ) Notice: Subject to any disclaimer, the term of this patent is extended or adjusted under 35 U.S.C. 154(b) by 383 days.

(21) Appl. No.: 10/095,371

(22) Filed: Mar. 8, 2002

(51) Int. Cl.
*G06F 7/00* (2006.01)

(52) U.S. Cl. .............................................. 707/1; 707/5

(58) Field of Classification Search ................... 707/1, 707/3, 5, 200, 100, 4, 104.1, 102
See application file for complete search history.

(56) References Cited

U.S. PATENT DOCUMENTS

2003/0050927 A1* 3/2003 Hussam ......................... 707/5
2003/0055810 A1* 3/2003 Cragun et al. ................. 707/1

* cited by examiner

*Primary Examiner*—Charles Rones
*Assistant Examiner*—Belix M. Ortiz
(74) *Attorney, Agent, or Firm*—Marger Johnson & McCollom P.C.

(57) ABSTRACT

One embodiment of the present invention enables an individual to selectively choose an area(s) of interest and automatically scan a database to intelligently retrieve the relevant information and filter out the irrelevant information. Next, the relevant information may then be collated and made available in an electronic "book" format for ease of distribution. For example, a network administrator may go to his/her company's web page and utilize the present embodiment to download an electronic "book" pertaining to troubleshooting his/her particular network configuration. It is appreciated that the present embodiment may be utilized in a broad number of different areas since it covers any application where there may be a huge database of information and only a part of which may be of interest to selected parties. For example, the present embodiment may be quite useful in areas such as, but not limited to, pharmaceutical, manufacturing, medical, defense, and computer networking.

27 Claims, 14 Drawing Sheets

Content Creator associates MRUs and/or VDs (info products) with metadata values

Content Creator associates MRUs and/or VDs (info products) with metadata values

METHOD AND SYSTEM FOR PROVIDING A USER-CUSTOMIZED ELECTRONIC BOOK

TECHNICAL FIELD

The present invention relates to the field of information and/or data. More specifically, the present invention relates to the field of delivering information and/or data from a database.

BACKGROUND ART

Computers are useful functional devices which are fabricated in a variety of sizes ranging from computers which occupy large office space down to computers which are held in one's hand. These varying sizes of computers also perform an extremely wide variety of useful operations, depending on the software which is installed within their particular memory storage device. For instance, computers have become an integral tool used in a wide variety of different applications, such as in finance and commercial transactions, computer-aided design and manufacturing, health care, telecommunication, education, etc. Additionally, computers are finding new applications as a result of rapid advances in hardware technology and development in software technology. Furthermore, a computer system's functionality is dramatically enhanced by coupling stand-alone computers together to form a computer network. In a computer network, computer users may readily exchange files, communicate via electronic mail (e-mail) and via video teleconferencing, pool resources, and share information stored on a common database.

It is understood that a computer accessible database can store an extremely wide range of information. For example, the database can potentially store information pertaining to manufacturing, pharmaceuticals, computer equipment, medical, defense, computer networking, chemistry, financial, among many others. Additionally, the computer accessible database can potentially store thousands of reference materials, instruction manuals, troubleshooting guides, set-up instructions, and any other resources covering different topics that are available to a product end user. As such, the computer accessible database can be a vast resource of information.

However, it should be pointed out that there are disadvantages associated with the typical computer accessible database. One of the disadvantages is that a computer user may find it difficult to locate relevant information associated with a specific topic within the computer accessible database that includes a huge amount of information. Furthermore, if one or more portions of the relevant information are retrieved from the database, they may not include the context necessary for understanding them.

SUMMARY OF THE INVENTION

Accordingly, a need exists for a method and system for enabling a computer user to more easily locate relevant information associated with a specific topic within a computer accessible database that includes a huge amount of information. Additionally, a need exists for a method and system which satisfies the above mentioned need and provides context for understanding the located relevant information associated with the specific topic. Embodiments of the present invention provide methods and systems which accomplish the above mentioned needs.

For example, one embodiment of the present invention enables an individual to selectively choose an area(s) of interest and automatically scan a database to intelligently retrieve the relevant information and filter out the irrelevant information. Next, the relevant information may then be collated, and the content included further refined by the user, formatted, and made available in an electronic "book" format for ease of distribution. For example, a network administrator may go to his/her company's web page and utilize the present embodiment to download an electronic "book" pertaining to troubleshooting his/her particular network configuration. It is appreciated that the present embodiment may be utilized in a broad number of different areas since it covers any application where there may be a huge database of information and only a part of which may be of interest to selected parties. For example, the present embodiment may be quite useful in areas such as, but not limited to, pharmaceutical, manufacturing, medical, defense, and computer networking.

In another embodiment, the present invention includes a method for providing an electronic document from a database of information. The method includes establishing the database to include a plurality of document elements and a plurality of metadata associated with the plurality of document elements. Furthermore, the method includes enabling a remote computing device to communicate with a server via a communication path. The method also includes the server receiving a search query associated with the database of information. In response to the server receiving the search query, the method includes the server retrieving a sub-group of document elements from the plurality of document elements using the plurality of metadata and the search query. In response to the server retrieving the sub-group of document elements, the method includes the server organizing the sub-group of document elements to provide contextualization to information associated with the sub-group of document elements resulting in the electronic document Additionally, the method includes the server providing the electronic document to the remote computing device via the communication path.

In yet another embodiment, the present invention includes a computer readable medium having computer readable code embodied therein for causing a computer to perform particular actions. The computer readable medium includes causing the computer to perform establishing a database of information to include a plurality of document elements and a plurality of metadata associated with the plurality of document elements. Furthermore, the computer readable medium includes causing the computer to perform receiving a search query associated with the database of information. In response to the receiving the search query, the computer readable medium includes causing the computer to perform retrieving a sub-group of document elements from the plurality of document elements using the plurality of metadata. In response to the retrieving the sub-group of document elements, the computer readable medium includes causing the computer to perform organizing the sub-group of document elements to provide contextualization to information associated with the sub-group of document elements resulting in an electronic document.

In still another embodiment, the present invention includes a system for providing an electronic document from a database of information to a remote computing device. The system includes the database of information comprising a plurality of document elements and a plurality of metadata associated with the plurality of document elements. Additionally, the system includes a server for receiving a search query associated with the database of information, retrieving a sub-group of document elements from the plurality of document elements using the plurality of metadata and the search query, organizing the sub-group of document elements to provide contextualization to information associated with the sub-group of document elements resulting in the electronic document, and providing the electronic document to the remote computing device via a communication path.

In another embodiment, the present embodiment includes a system for providing an electronic document from a database of information. The system includes means for establishing the database to include a plurality of document elements and a plurality of metadata associated with the plurality of document elements means. Furthermore, the system includes means for receiving a search query associated with the database. Additionally, the system includes means for retrieving a sub-group of document elements from the plurality of document elements using the plurality of metadata and the search query, in response to receiving the search query. Moreover, the system includes means for organizing the sub-group of document elements to provide contextualization to information associated with the sub-group of document elements resulting in the electronic document, in response to retrieving the sub-group of document elements.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
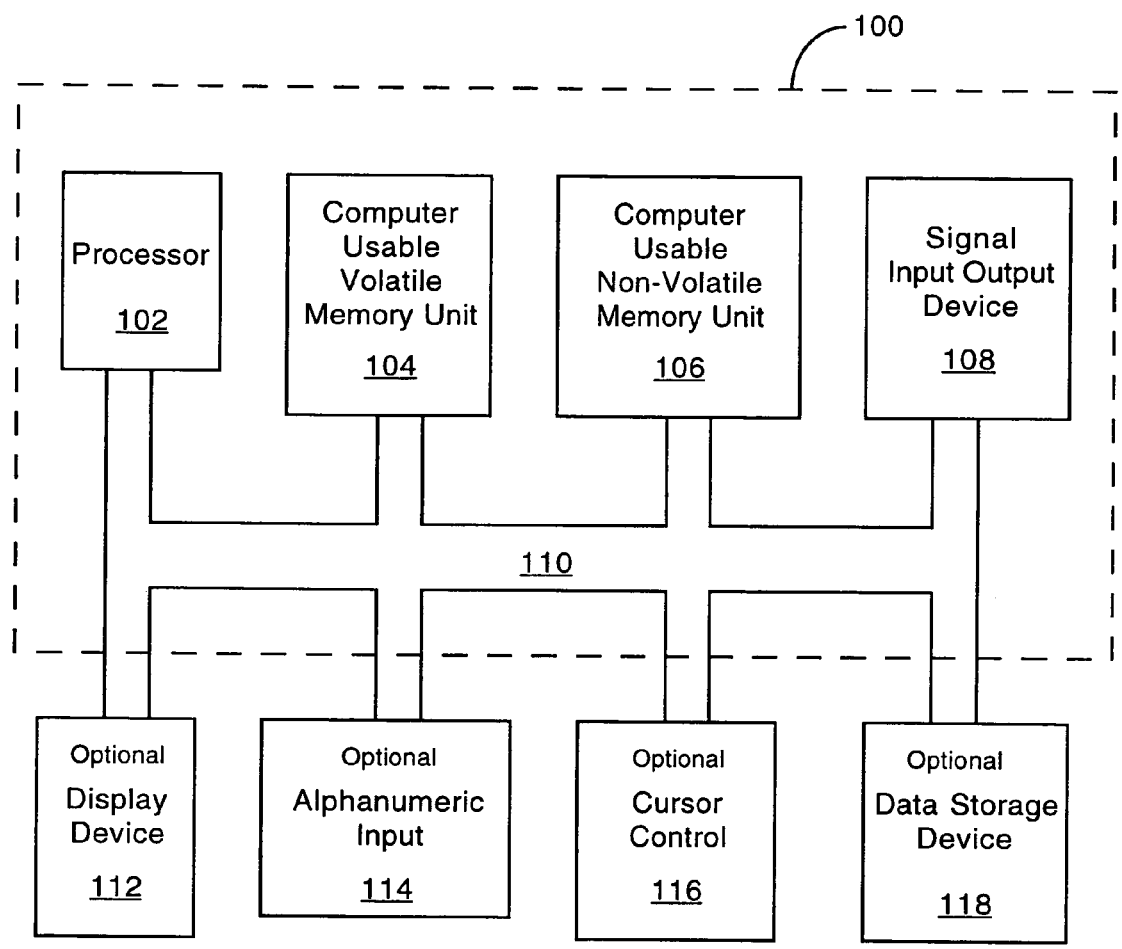
FIG. 1 is a block diagram of an exemplary computer system used in accordance with an embodiment of the present invention.

Reference will now be made in detail to embodiments of the invention, examples of which are illustrated in the accompanying drawings. While the invention will be described in conjunction with different embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the following detailed description of the present invention, numerous specific details are set forth in order to provide a thorough understanding of the present invention. However, it will be clear to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within an electronic computing device or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals may be referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "enabling", "establishing", "providing", "organizing", "retrieving", "generating", "determining", "selecting", "outputting", "transmitting", "locating", "storing", "receiving", "utilizing", "providing", "displaying" or the like, may refer to the action and processes of a computing system, or similar electronic computing device, that manipulates and transforms data. The data may be represented as physical (e.g., electronic) quantities within the computing system's registers and memories and may be transformed into other data similarly represented as physical quantities within the computing system's memories or registers or other such information storage, transmission, or display devices.

Exemplary Hardware in Accordance with the Present Invention

FIG. 1 is a block diagram of an exemplary computer system 100 used in accordance with an embodiment of the present invention. It should be appreciated that system 100 is not strictly limited to be a computer system. As such, system 100 of the present embodiment is well suited to be any type of computing device (e.g., server computer, portable computing device, desktop computer, mobile phone, pager, personal digital assistant, and the like). Within the following discussions of the present invention, certain processes and steps are discussed that are realized, in one embodiment, as a series of instructions (e.g., software program) that reside within computer readable memory of computer system 100 and executed by a processor(s) of system 100. When executed, the instructions cause computer 100 to perform specific actions and exhibit specific behavior which is described herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices 108 coupled with bus 110 for enabling system 100 to interface with other electronic devices and/or computer systems. The communication interface(s) 108 of the present embodiment may include wired and/or wireless communication technology. For example, within the present embodiment, the communication interface(s) 108 may be a serial communication port, a Universal Serial Bus (USB), an Ethernet adapter, a FireWire (IEEE 1394) interface, a parallel port, a small computer system interface (SCSI) bus interface, an infrared (IR) communication port, a Bluetooth wireless communication port, a broadband interface, or an interface to the Internet, among others.

Optionally, computer system 100 may include an alphanumeric input device 114 which includes alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The cursor directing device 116 may be implemented using a number of well known devices such as a mouse, a track-ball, a track-pad, an optical tracking device, a touch screen, etc. Alternatively, it is appreciated that a cursor can be directed and/or activated via input from the alphanumeric input device 114 using special keys and key sequence commands. The present embodiment is also well suited to directing a cursor by other means such as, for example, voice commands.

The system 100 of FIG. 1 may also include one or more optional computer usable data storage devices 118 such as a magnetic or optical disk and disk drive (e.g., hard drive or floppy diskette) coupled with bus 110 for storing information and instructions. Furthermore, the data storage device(s) 118 may be, but is not limited to, a Zip drive, a memory stick, a compact disc (CD), smart media, a compact flash memory, a PC Card conforming to the Personal Computer Memory Card International Association (PCMCIA) specification, and a digital versatile disc (DVD), among others. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Exemplary Network in Accordance with the Present Invention

Figure 2:
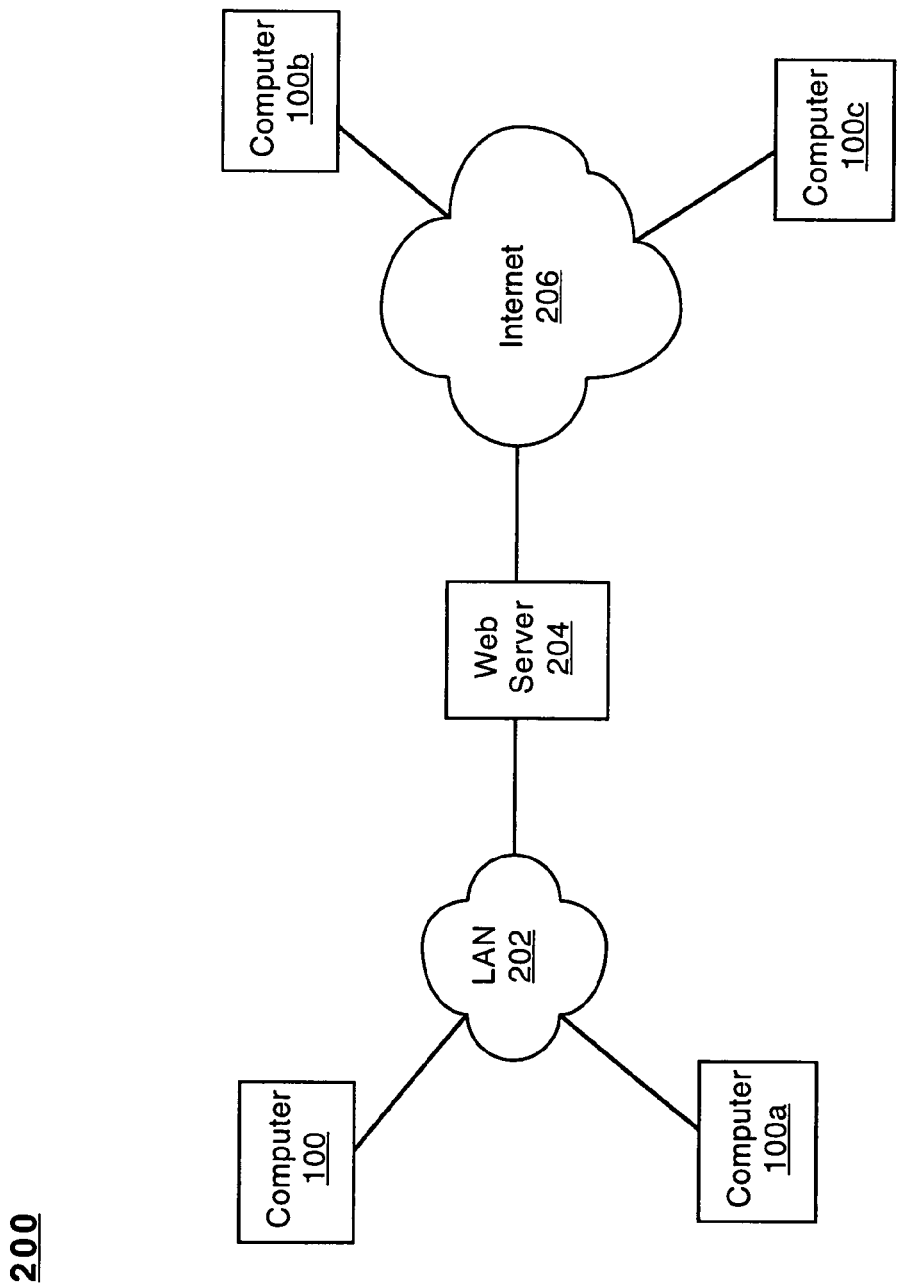
FIG. 2 is a block diagram of an exemplary network for providing a user-customizable electronic "book" in accordance with an embodiment of the present invention.

FIG. 2 is a block diagram of an exemplary network 200 for providing a user-customizable electronic "book" in accordance with an embodiment of the present invention. Network 200 enables a user of a computer (e.g., 100, 100a, 100b, and/or 100c) to communicatively couple with a server (e.g., 204) in order to receive desired information from a potentially huge database. For example, web server 204 may provide a web page to a user of computer 100 enabling him or her to selectively choose an area(s) of interest which automatically causes server 204 to scan a potentially huge database in order to intelligently retrieve only the relevant information and filter out the irrelevant information. The web server 204 may then organize the relevant information in order to provide context for it. The contextualized relevant information may then be downloaded to computer 100 in an electronic "book" format for ease of use and/or distribution. For example, a network administrator may go to his/her company's web page provided by web server 204 in order to download an electronic "book" pertaining to troubleshooting his/her particular network configuration.

Within network 200 there are at least a couple of ways for a user of a computing device (e.g., 100, 100a, 100b or 100c) to access web server 204. For example, the user may utilize computing device 100b (or 100c) to access web server 204 via the Internet 206. Specifically, the user may enter into a web browser operating on computer 100b the web address of the web server 204. As such, computing device 100b communicatively couples to the web server 204 via the Internet 206. Another way a user of a computing device (e.g., 100 or 100a) may access web server 204 is via a local area network (LAN) 202. For example, the user may utilize a web browser or any other method in order to cause computing device 100 (or 100a) to communicatively couple to the web server 204 via LAN 202.

It is noted that network 200 of the present embodiment is well suited to other configurations in accordance with the present invention. For example, local area network 202 and computers 100 and 100a may be removed thereby leaving a configuration including web server 204, the Internet 206 and one or more computers 100b and/or 100c. Alternatively, the Internet 206 and computers 100b and 100c may be removed thereby leaving a configuration including web server 204, local area network 202 and one or more computers 100 and/or 100a. In the alternative, a configuration in accordance with the present embodiment may just include the web server 204 wherein a user may directly utilize its functionality.

The network 200 of FIG. 2 includes web server 204 and computers 100b and 100c which may each be communicatively coupled to the Internet 206. Additionally, web server 204 and computers 100 and 100*a* may each be communicatively coupled to the local area network (LAN) 202. It is understood that web server 204 of the present embodiment may be implemented as one or more physical devices. Additionally, it is appreciated that the local area network 202 may be internal to a company or business.

Within network 200 of the present embodiment, web server 204 and computers 100 and 100*a* may be communicatively coupled to the local area network 202 via wired and/or wireless communication technologies. Furthermore, web server 204 and computers 100*b* and 100*c* may be communicatively coupled to the Internet 206 via wired and/or wireless communication technologies. It is understood that the web server 204 and computers 100*a*-100*c* may each be implemented within the present embodiment in a manner similar to computer 100 of FIG. 1, described herein.

Exemplary Operations in Accordance with the Present Invention

Figure 3:
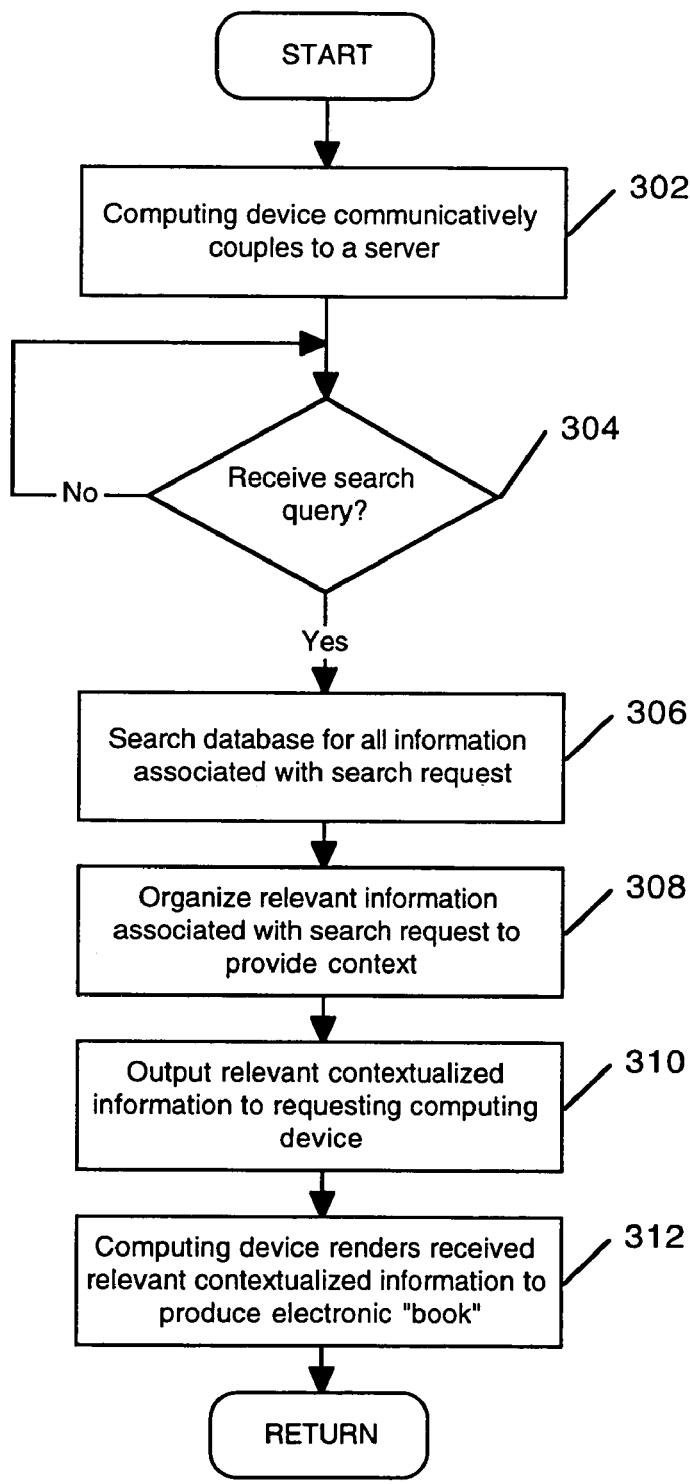
FIG. 3 is a flowchart of steps performed in accordance with an embodiment of the present invention for providing a user-customizable electronic "book".

FIG. 3 is a flowchart 300 of steps performed in accordance with an embodiment of the present invention for providing a user-customizable electronic "book". Flowchart 300 includes processes of the present invention which, in one embodiment, are carried out by processors and electrical components under the control of computer readable and computer executable instructions. The computer readable and computer executable instructions reside, for example, in data storage features such as computer usable volatile memory 104, computer usable non-volatile memory 106 and/or computer usable data storage device 118 of FIG. 1. However, the computer readable and computer executable instructions may reside in any type of computer readable medium. Although specific steps are disclosed in flowchart 300, such steps are exemplary. That is, the present embodiment is well suited to performing various other steps or variations of the steps recited in FIG. 3. Within the present embodiment, it should be appreciated that the steps of flowchart 300 may be performed by software, by hardware, or by any combination of software and hardware.

The present embodiment provides content consumers the ability to dynamically assemble their own virtual documents from a database of information, (e.g., according to the structure provided in a document type definition) that contains only the content relevant to their particular interest, presented in a meaningful context, or to find specific information within the database quickly for on-line viewing. Specifically, the database information may be assembled into a single repository and tagged with metadata in order to facilitate search, retrieval, and eventual organization of the content retrieved. Additionally, an interface (or portal) may be implemented to allow users to select a subset of the retrieved information and/or data using a metadata-directed search, and then assemble a custom document containing only that information which matched their search parameters. Furthermore, users may be able to select any or all of this information for inclusion in their customized documents.

At step 302 of FIG. 3, a computing device (e.g., 100, 100*a*, 100*b* or 100*c*) communicatively couples to a server (e.g., 204) in order to request delivery of an electronic "book" containing one or more specific topics. It is appreciated that the computing device may communicatively couple to the server at step 302 in a wide variety of ways in accordance with the present embodiment. For example, the computing device may communicatively couple to the server via wired and/or wireless communication technology. Additionally, the computing device may communicatively couple to the server via one or more networks, e.g., a local area network (e.g., LAN 202), a wide area network (WAN), the Internet (e.g., 206), a metropolitan area network (MAN), a wireless local area network (WLAN), a wired and/or wireless telecommunication network, among others.

In step 304, the present embodiment determines whether it has received from the computing device a search query associated with a database of information stored by the server (e.g., 204). If the present embodiment determines at step 304 that it has not received from the computing device a search query associated with the database of information, the present embodiment proceeds to the beginning of step 304. However, if the present embodiment determines at step 304 that it has received from the computing device a search query associated with the database of information, the present embodiment proceeds to step 306. It is understood that step 304 may be performed in a wide variety of ways in accordance with the present embodiment.

For example, the present embodiment may provide at step 304 of FIG. 3 a web page to the computing device which enables its user to input his or her desired search query of the database. The search query of step 304 may include any type of metadata criterion or criteria that may be utilized to search the database of information. Additionally, the search query may be a request for a virtual document specification of one or more topics or for a reproduction of a document from a previously saved criteria set. Furthermore, the provided web page at step 304 may contain a user friendly search query interface that includes, but is not limited to, one or more parameter list-boxes, one or more drop-down boxes and/or one or more boxes to be filled in which define one or more metadata search criteria, or visual selection options that fulfill the same purpose. Once metadata criteria are selected, the present embodiment may also construct a structured query language (SQL) query based upon the user's metadata selection and returns any other topics tagged with the matching metadata. As such, the user may then choose to further refine the search query.

It is appreciated that the database of information of step 304 may include any amount of information and/or data. For example, the database may include a huge amount or a small amount of information. Additionally, the database of information may include any type of information such as, but not limited to, medical, pharmaceutical, manufacturing, computer equipment, defense, computer networking, chemical, financial, reference materials, instruction manuals, troubleshooting guides, set-up instructions, any resources covering topics that are available to a product end user, among many others. Alternatively, the web page associated with the search query may also include formatting and content options, thereby enabling the computing device user to customize, for example, page content, title of document, whether to include an appendix, compression format, document format, e.g., Portable Document Format (PDF), Hypertext Markup Language (HTML), etc., how to sort topics (e.g., alphabetically, by technology, etc.), among others. It is noted that this selection is made possible, in part, by metadata.

Step 304 of FIG. 3 enables a computer user to retrieve information from the database by entering a search query, either in the form of a database search query, as a natural language search, or by visual selection of criteria. Within one embodiment, the results of either type of search may be viewable in two ways. For example, the first viewable way may be as a complete module or information product, viewable on-line or printable. For example, the computer user may be offered virtual documents referred to as Information Products, or in smaller units referred to as Modules. The structure of these virtual documents may be governed by document type definitions (DTDs), as will the structure of the Minimum Revisable Units (MRUs) themselves, which are described herein. The second viewable way may be as a content object with links indicating the context of the object depending upon the search query.

It is understood that a computer user who wishes to assemble an information product or module will enter a query at step 304, may make final selections from the results of that query, and direct the system to assemble and produce a document that is similar to current printed documentation, available in a variety of formats (e.g., HTML, PDF, print, audio, voice, and others). Alternatively, users who want information on a specific and relatively narrow topic, and do not want an information product or module, can query the database repository at step 304, may make a selection from the returns of the query, view on-line information, and continue to refine the search until the desired information is produced for on-line viewing.

One aspect of implementing process 300 may be to have authors of information create content objects within the context of a virtual document at the module level. Specifically, authors may create or modify Minimum Revisable Units (MRUs) inside a module that is composed of many MRUs assembled according to a document type definition (DTD). The MRUs themselves may be persisted into the Content Management System, tagged with the appropriate metadata. Authors may also be able to create or retrieve these MRUs in the context of a Module. Therefore, even though an author may not need to change (and may not be permitted to change) other parts of the Module, he/she can view the information that surrounds the part he/she desires to change. The authors may be trained to write with reusability in mind. Additionally, editors may be trained to recognize potential problems with reusability and assist writers in maximizing the potential for reusability for each object developed.

Within an embodiment of process 300 of FIG. 3, it is desirable that decompilation of a virtual document into its constituent MRUs should be straightforward. It is also desirable, however, for content creators to be insulated from the details of saving each of the MRUs in their virtual documents individually. Authors should be able to retrieve, modify, or create MRUs, insert them into the virtual document in accordance with the DTD, after which they are saved automatically by an authoring/content management system.

At step 306, the present embodiment searches the database for all information associated with the received search query. It is understood that the database and its information may be organized in a wide variety of ways in accordance with the present invention. For example, the database may be one or more extensible Markup Language (XML) files wherein each predefined piece of information (e.g., text object) has one or more metadata associated with it, as described herein. In this manner, the present embodiment is able to utilize the metadata at step 306 to search and retrieve all of the information associated with the received search request. Furthermore, the information of the database may be in any type of format such as a sentence, a paragraph, a task, a concept, a procedure, an introduction, a graphic file, or a file containing video and/or voice content, among others. Additionally, the information of the database may be searched at step 306 in a wide variety of ways in accordance with the present embodiment.

As part of implementing the database search at step 306, the database of the present embodiment may be organized in diverse ways in accordance with the present invention. For example, a content structural paradigm may include a four level hierarchy of content structure definitions. It should be pointed out that higher level content objects contain one or more lower level content objects. Specifically, the highest level content object may be referred to as Information Products which are roughly analogous to a book. The Information Products are composed of one or more Modules, plus the requisite front and end matter usually necessary to create a complete document.

Within FIG. 3, the next content level of database organization may be referred to as modules which are roughly analogous to a chapter in a book, but may also be roughly analogous to a section. A module may cover a number of tasks (e.g., as opposed to a specific task with specific steps, covered by a single procedure content type instance). As previously mentioned, Information Products contain one or more modules. The module is the level of the hierarchy within which authors may typically work while authoring content for a Content Object Management Strategy (COMS). While writers may "see" an entire module in the editing environment, they may or may not "own" (e.g., and thus be able to edit) all of the content objects which make up that module. Within the present embodiment, information consumers may assemble custom Information Products by searching for and selecting modules. Additionally, users may not be allowed to rearrange information in a module they select, but they may "turn off" specific content type objects.

The next lower content level of database organization may be referred to as content types which are very roughly analogous to a short section in a book. Content types are the smallest "chunks" of information that the present embodiment allows external users to access. Computer users may be able to "turn on" and "turn off" content types within modules. For example, a user may select a module and specify that only the module's procedure content types be included in his/her custom document, while the concept content types are not included.

Within FIG. 3, the lowest content level of database organization may be referred to as elements which are the smallest chunks of information which might be reused by content creators within the present embodiment. Elements are also known as Minimum Revisable Units (MRUs), since they are the smallest entities which have a defined structure. Within one embodiment, users may not be exposed to the level of granularity of an element since it usually will not provide useful information on its own, but typically exists to support information in the context of a containing entity, such as a content type or Configuration Process Module (CPM). For example, a lead-in sentence or a heading may be elements, but really have no meaning outside the content type instance in which they occur. In addition, some elements are automatically generated from parsing specified content objects.

It is understood that a document type definition (DTD) is the set of rules that govern the construction of an XML document. It contains a list of the content objects, and the tags and attributes that identify these objects and describe their relationships to each other. The present embodiment uses an external DTD, meaning that the DTD resides in a separate file from the document it describes, and may be linked to that document by an external Uniform Resource Locator (URL). This allows the use of one DTD to govern the construction of many document instances. However, the DTD does not specify formatting of any sort. A separate document, an Extensible Stylesheet Language (XSL) style sheet, specifies formatting for a specific presentation. The present embodiment may include any number of style sheets for different presentations, such as, HTML, print/PDF, Personal Digital Assistant (PDA), and ASCII text.

There are advantages associated with utilizing DTDs. For example, DTDs can provide a template that can (with appropriate XML authoring tools) be enforced. Specifically, a DTD can act as a template for a document by showing how the different content objects are arranged without actually providing the data for these objects. The DTD may also specify which objects may be required in the final assembly of content and which are optional, and how many of a specific content object may be required or permitted at each location. The XML authoring tool may require that authors follow these rules. For example, if a paragraph is required before the task table showing the individual steps of a procedure, the XML authoring tool will require that some text be written in the paragraph. Additionally, to a limited degree, the system may check for the appropriateness of the data typed into this example paragraph. For example, the tool could check to see whether appropriate punctuation has been applied (e.g., no question marks or unpunctuated text). The rules by which the system conducts these checks are included in the DTD.

Within FIG. 3, another advantage associated with utilizing DTDs is that they automate the insertion of boilerplate text. Specifically, the DTD can specify that boilerplate text from an external file be automatically inserted at a specific location when the document is assembled. For example, the DTD specifies that when users create their custom documents using the DTDs as blueprints, these documents will automatically have the appropriate "legalese" inserted at the beginning of the document. Additionally, writers will not have to worry about footers and headers. Information for these will be derived from the XSL style sheet for formatting, and from the elements within the document itself for data.

Yet another advantage associated with utilizing DTDs is that they allow some content objects to be built and inserted automatically. For example, the list of required steps that precedes a configuration procedure can be built from the steps in the procedure that start with the word "required" in the left column. The author does not have to update the list because it's automatically derived from the updated procedure steps themselves.

Still another advantage associated with utilizing DTDs is that they provide a framework for reusing content objects. It is understood that it is possible to track down a "chunk" of content that may be used in a document other than the one for which it was originally written. However, that chunk of content may not have the tagging for automation that using the DTD makes possible, may not have the same content elements (or it may not have them in the same order), and probably is not written with possible reuse in other types of documents as a priority. A carefully devised structure permits exchange of content type instances between such different end products as printed documents, on-line help, and PDA-readable summaries.

Figure 4:
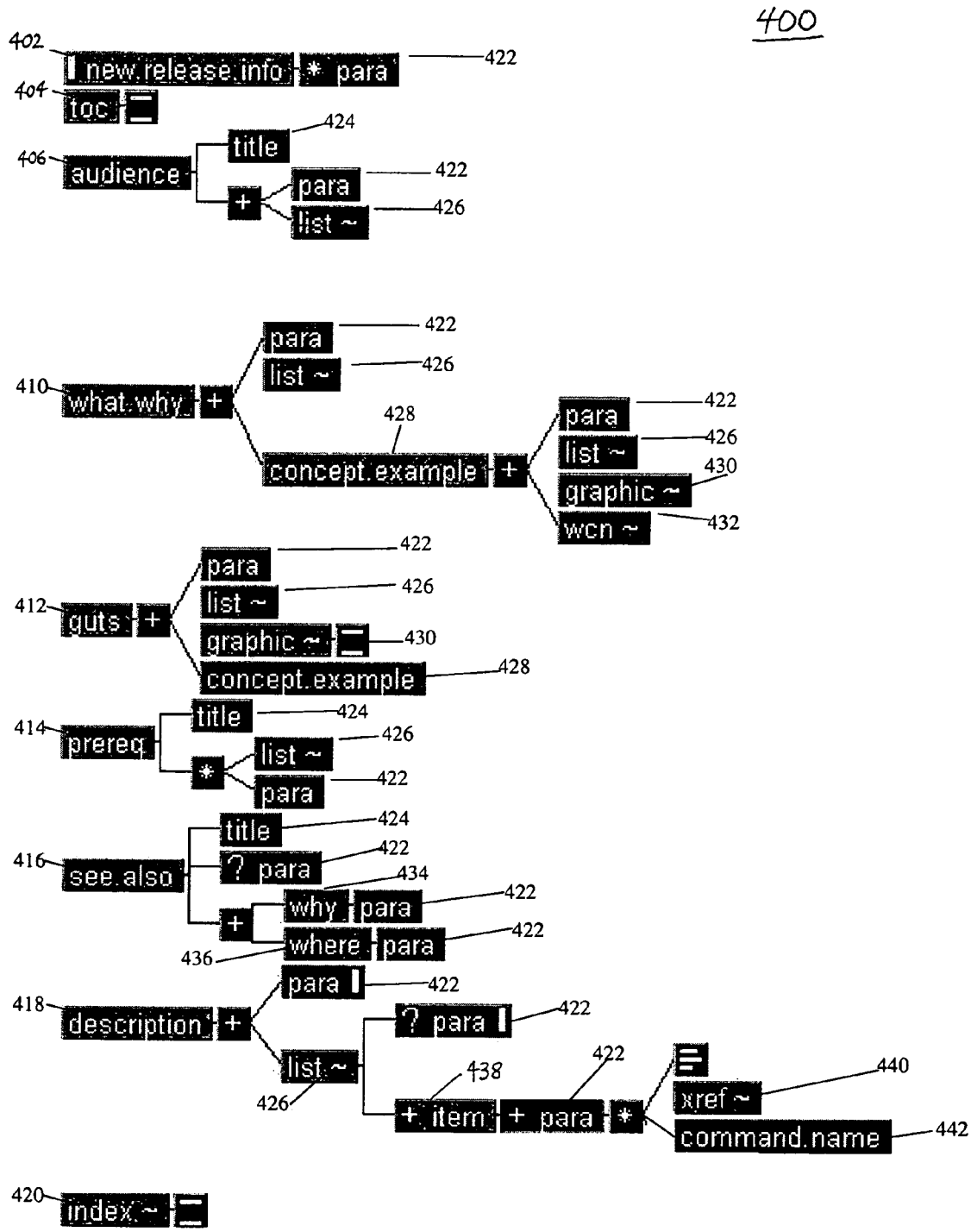
FIG. 4 is one embodiment of an exemplary tree diagram showing "elements" of a document type definition (DTD) structure in accordance with the present invention.
Figure 5:
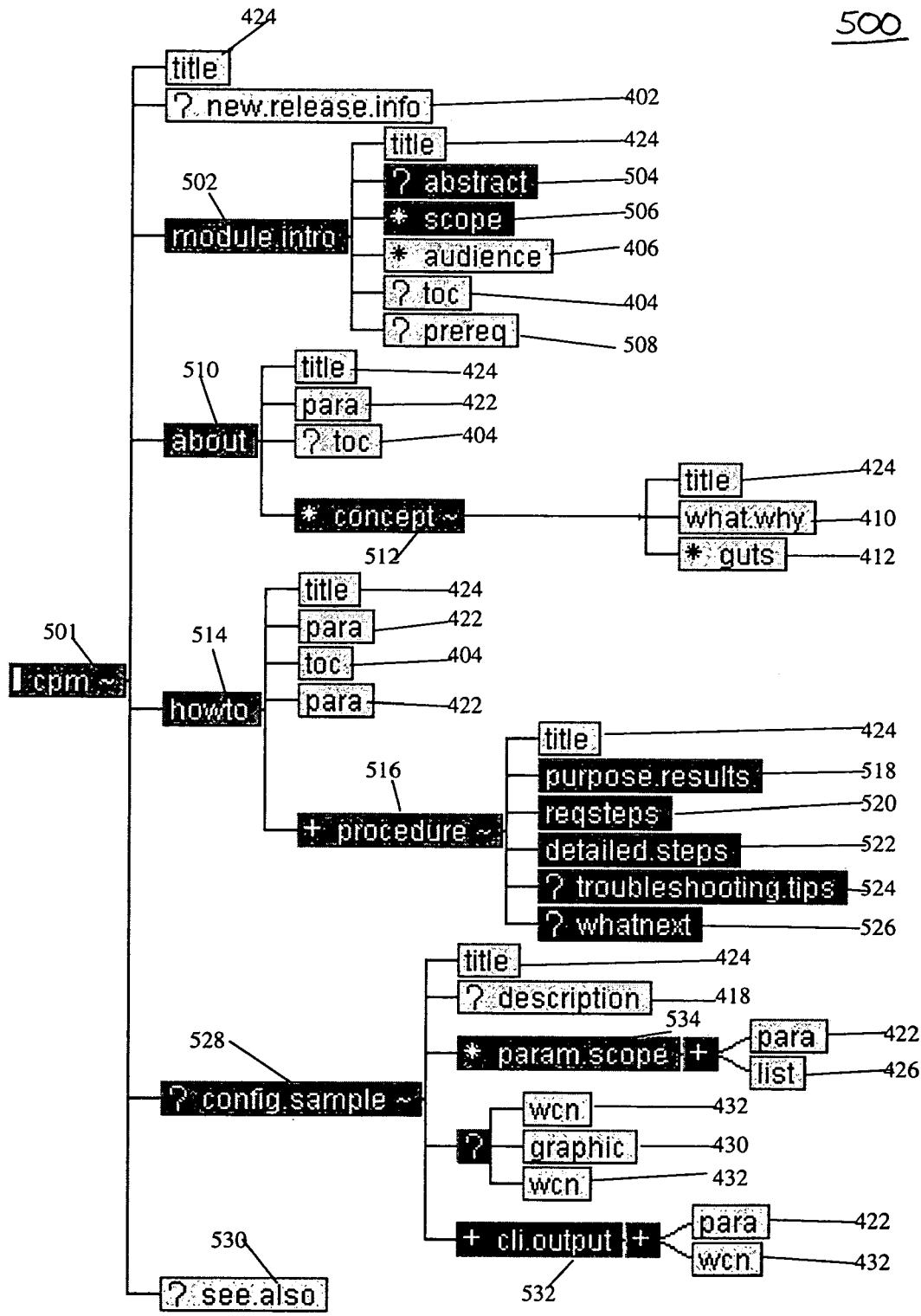
FIG. 5 is an embodiment of an exemplary tree diagram showing a Configuration Process Module (CPM) of a DTD structure in accordance with the present invention.
Figure 6:
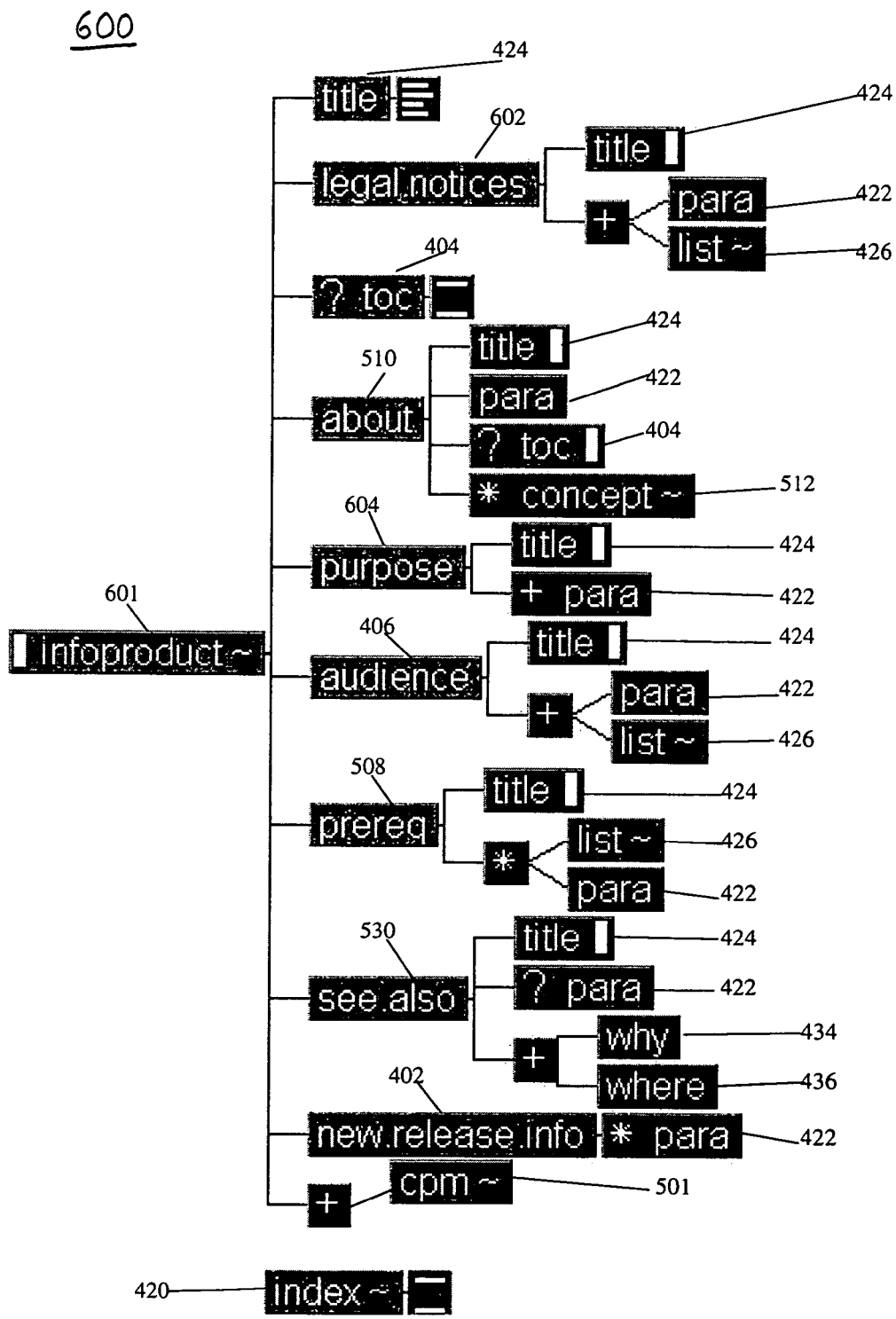
FIG. 6 is an embodiment of an exemplary tree diagram showing an Information Product of a DTD structure in accordance with the present invention.

FIGS. 4, 5 and 6 are embodiments of tree diagrams for showing exemplary DTD structures that may be utilized to develop XML files in accordance with the present invention. These types of DTD structures may be utilized to implement the database search at step 306. It should be pointed out the FIGS. 4, 5 and 6 include XML notation, e.g., question mark (?), asterisk (*), equal sign (=) and plus sign (+). Specifically, the question mark indicates that something is optional. For example, you may include the part indicated by the question mark or leave it out. The question mark has a cardinality: 0 . . . 1. The asterisk indicates that any number, including none, of the content objects marked by the asterisk is optional. The asterisk has a cardinality: 0 . . . many. The equal sign indicates that something is automatically generated. For example, XML code within the DTD specifies the elements from which the part marked with the equal sign should be generated. The plus sign indicates that one is required and more are permitted.

FIG. 4 is one embodiment of an exemplary tree diagram 400 showing "elements" of a DTD structure in accordance with the present invention. The tree diagram 400 includes many different entities. Specifically, the first entity is a "new.release.info" 402 which provides information about what's new, what's different from previous releases. Within the present embodiment, the new release information 402 may be automatically disabled (e.g., not presented by default) at the occurrence of an event specified by the version/image Subject Matter Expert (SME) and appropriate Information Product owners. The purpose of "new.release.info" 402 is to advise the user that the functionality covered in this configuration module is new or different from previously released functionality. Another entity is a table of contents "toc" 404 which is automatically generated from specified titles of specified objects. The purpose of "toc" 404 is to serve as an advance organizer to help the user find specific information, determine whether an instance of a content type, module, or Information Product is what he/she wants, and to navigate through the information covered by the table of contents 404. Yet another entity is a "title" 424 which is the name of the specific instance of the entity that immediately follows. The purpose of "title" 424 is to provide a way for humans to identify instances of content objects and entities.

Still another entity is an "audience" 406 which describes the user roles for which this content object is intended. There may be multiple audiences 406 in one content object instance. The purpose of "audience" 406 is to enable a user to find information that addresses user concerns at a specific level and may help the user assemble job-appropriate Information Products. Yet another entity is a Warning, Caution, Note "wcn" 432 which may be a single paragraph accompanied by appropriate formatting and/or graphics to call special attention to the content. The purpose of "wcn" 432 is to inform a user of potential danger to humans, potential loss of data, or possible cause of system problems, or advises or reminds a user of information that is explained in detail elsewhere but important to remember in this context. It is noted that many warnings may be fixed content used without modification in many different contexts, and as such are reusable in and of themselves.

Within FIG. 4, the entity "what.why" 410 is a description of the functionality, product, or processes being described. The purpose of "what.why" 410 is to inform the user of the subject of the information that follows, and explain why it may be of interest to the user. Another entity is a "concept.example" 428 which may be any combination of visual or verbal examples of the concept being described, placing it in a specific context or explaining it in terms of a specific context. The purpose of "concept.example" 428 is to help the user understand the concept being explained, or visualize how the concept could be used in a specific context.

Yet another entity is a "guts" 412 which is a description of a process and/or idea. The purpose of "guts" 412 is to help the user understand the conceptual underpinnings that facilitate the required generalization of the skills required for successful completion of a task. Additionally, the purpose of the "guts" 412 is to provide the information a user may need to understand when to use a procedure, and how to integrate the use of one procedure with the use of others. The entity "why" 434 is an explanation of the reasons a user might want to go to and look at the additional information source. Its purpose is to help a user find more detailed information on the same topic, or detailed information on a specific related topic. Another entity is a "where" 436 which provides the location of related information. The purpose of "where" 436 is to provided as a link (usually) to help the user find and get to related information as quickly as possible.

Within FIG. 4, the entity "description" 418 provides information about the content entity that follows. Is should be understood that "description" 418 may be implemented in a configuration module DTD as shown in FIG. 5. The purpose of "description" 418 of FIG. 4 is to help the user to decide if the information is what he/she needs to perform a specific task. Another entity is a "command.name" 442 which is an as-documented form of a specific command. The purpose of "command.name" 442 is to identify the command being described or used. Another entity is an "item" 438 which is an item inside of a list, which can be any information. Another entity is an "index" 420 which is an automatically generated list. The contents of "index" 420 may depend upon criteria selected by the author, Information Product manager, metadata manager, version SME, and the user. The purpose of "index" 420 is to provide a quick and easy way to find information on a specific topic within an Information Product or configuration module when it is presented in a printable format.

FIG. 5 is an embodiment of an exemplary tree diagram 500 showing a Configuration Process Module (CPM) 501 of a DTD structure in accordance with the present invention. Within the present embodiment, a Configuration Process Module 501 is designed to address a specific procedure which instructs a reader how to accomplish a specific task. The scope of a configuration module may be determined during Task Analysis by writers and subject matter expects (SMEs).

Specifically, one of the entities is "new.release.info" 402 which may be a content type, or it may be a concept content instance. The "new.release.info" 402 includes information about what's new, what's different from previous releases. The "new.release.info" 402 may be automatically disabled (not presented by default) at the occurrence of an event specified by the version/image SME and appropriate Information Product owners. The purpose of "new.release.info" 402 is to advise the user that the functionality covered in this configuration module is new or different from previously released functionality. Another entity is a "module.intro" 502 which is a description of the configuration module's purpose, contents, organization, and conventions. The purpose of "module.intro" 502 is to give the user an idea of whether he/she can use the information in the configuration module for his or her intended purpose, and provides a "user interface" tutorial for the module. Yet another entity is an "abstract" 504 which summarizes the information contained within the module and describes the user task the information is intended to support. The purpose of "abstract" 504 is to help the user understand the nature and purpose of the information in the configuration module prior to going into the details contained within the module.

Within FIG. 5, another entity is a "scope" 506 which describes the limits of the information within the configuration module. The purpose of "scope" 506 is to help the user understand the limits of the information in the configuration module prior to going into the details contained within the module. Other entities of diagram 500 include "audience" 406 and table of contents "toc" 404 which have been described in detail herein. Another entity is a "prereq" 508 which lists the conditions that should be met before the user can understand and use the information in the configuration module. The purpose of "prereq" 508 is to help the user to prepare in advance all the necessary conditions before starting to read or use the information within the module. Yet another entity is an "about" 510 which contains the concepts the user should know and understand in order to successfully perform the tasks described in the configuration module. The purpose of "prereq" 508 is to list the conditions that may be met before the user can understand and use the information in the configuration module. Another entity is "title" 424 which has been described in detail herein.

Still another entity is a "concept" 512 which is a text, graphics, or media description of the ideas, facts, and context related to the task. The purpose of "concept" 512 is to help the user understand the conceptual underpinnings that facilitate the required generalization of the skills required for successful completion of the task. Furthermore, "concept" 512 also provides the information a user needs to understand when to use a procedure, and how to integrate the use of one procedure with the use of others. Other entities include "what.why" 410 and "guts" 412 which have been described in detail herein. Another entity is the "how.to" 514 which is a description of the user tasks for which information is provided in the included entities. The purpose of "how.to" 514 is to help the user to decide if the information is what he/she needs to perform a specific set of tasks defined in the scope of a task analysis session. Yet another entity is a "procedure" 516 which is a list of data/description pairs, with optional elements. The purpose of "procedure" 516 is to provide the information required to perform a specific task. Still another entity is a "purpose.results" 518 which is the purpose for performing the procedure and the results expected. In other words, "purpose.results" 518 is the outcome of the performance of the procedure. The purpose of "purpose.results" 518 is to help the user to decide if the information is what he/she needs to perform a specific task.

Within FIG. 5, another entity is a "req.steps" 520 which is an automatically generated list of the steps that may be performed to achieve the expected results of the procedure. The purpose of "req.steps" 520 is to enable the user to know the minimum steps required for a procedure to achieve the expected outcome. Additionally, "req.steps" 520 can be used with metadata to help the user determine which configuration steps require more advanced knowledge. Yet another entity is "detailed.steps" 522 which is a sequence of step/comment pairs that may include a very short example of how the successfully completed step looks, e.g., on the Command Line Interface (CLI). The purpose of the "detailed.steps" 522 is to provide all of the steps, optional and required, that are a part of the procedure. Still another entity is a "troubleshooting.tips" 524 which is information about the most common problems related to this task and how to solve them. The purpose of "troubleshooting.tips" 524 may be to help the user correct mistakes during the performance of the procedure or immediately afterwards. Another entity is a "what.next" 526 which is information on possible next task(s). The purpose of "what.next" 526 is to place the procedure within a context, and help the user determine his logical next action(s).

Yet another entity is a "config.sample" 528 which is a lengthier configuration example, including examples of most or all of the configuration steps that may be, for example, within a single annotated CLI output. The purpose of "config.sample" 528 is to help the user place the individual steps of the procedure within the context provided by the example. The "description" 418, "list" 426, "wcn" 432 are also included which are described herein. Another entity is a "param.scope" 534 which contains a list of the parameters within the "config.sample" 528. Its purpose is to help the user determine whether the "config.sample" 528 is appropriate for his/her purposes. Yet another entity is a "cli.output" 532 which is a listing of the output of a specific command. The purpose of "cli.output" 532 is to give the user an idea of what the output of his configuration using the command should look like. The "cli.output" 532 might be an example screen in a graphical user interface (GUI) or a drawing of a completed mechanical assembly in another embodiment. Still another entity is a "see.also" 530 which is a list of related commands, concepts, and information. The purpose of "see.also" 530 is to enable the user to find additional information on the task or concept, and places that information within a larger context.

FIG. 6 is an embodiment of an exemplary tree diagram 600 showing a Information Product 601 of a DTD structure in accordance with the present invention. Specifically, an entity is a "legal.notices" 602 which is boilerplate material, such as copyright notices, that may be required by a corporation in uncontrolled printable information. Another entity is a "purpose" 604 which describes what the information in the information product is intended to help the user accomplish. It is understood that the other entities of diagram 600 are described in detail herein.

Within reference to FIG. 3, it is understood that the metadata performs different functions in the database search at step 306 and the dynamic content system of process 300, including: identifying the type of structure containing the information (e.g., the kind of Content Type, Module, or Information Product); identifying criteria upon which a user can search to find specific information (such as the technology, solution, or command); specifying relationships between and among content objects, for example, which concept(s) apply to a configuration procedure, or which procedures require an understanding of a concept; and identifying the specific instance of a content structure so that it can be retrieved by a number of different query methods or cross-reference searches.

Within process 300 there are at least two distinct categories of metadata: content identification metadata and content description metadata. Specifically, the content identification metadata describes the type of a particular content element (e.g., example, procedure, concept, etc.), or identifies the specific instance of a content type. This content identification metadata may follow the form of <tag>=<value>. Any single content element instance may have one and only one value for each of these tags. However, if an element is nested in another, larger element, then the larger element may have a different value for the type tag than its constituent elements. Other types of content identification metadata may include administrative information such as author, date created, date last modified, version, date for end-of-life review, etc. This information may be included in the XML DTD and in the XML content itself. Additionally, most of these values may be automatically applied by the authoring system and some may be applied or modified by the content management system. It should be understood that the operational entity that controls the content management system for the content may control the content identification metadata vocabulary.

Within FIG. 3, the content description metadata identify what the content is about. These are the metadata values that may be used to find content elements in the document repository by both content contributors and content consumers. Content description metadata are equivalent to index entries in a traditional document (e.g., their values may be derived directly from a current master index). The content description metadata differ from content identification metadata in the following important ways: (1) most content description metadata are applied by the author of a content type instance; (2) content description metadata are often hierarchical; (3) elements tagged with a value at some point in the hierarchy may also inherit the values of that tag's parents; (4) a single tag can have "n" values associated with it; (5) all tags for content description metadata are essentially optional (e.g., the case when n =0); (6) the values for the metadata themselves are volatile (in other words, authors need to be able to modify content description metadata values at any time); and (7) metadata applied to a constituent MRU instance may be applied to any virtual documents that contain that MRU instance.

It is appreciated that Content Description metadata may be organized into hierarchies. For example, consider a technology hierarchy. A top level of the hierarchy may include values like IP, ATM, WAN, etc. Within the IP category, for example, there will be as many as 4 sub-levels, e.g., IP → IP Security → AAA → AAA Authorization If a content object instance is tagged with AAA Authorization, it is also in effect tagged with the values of all of AAA Authorization's parents. The desired outcome is for a search in IP, IP Security, AAA, or AAA Authorization to find the instance. Finding elements, of course, is crucial for content contributors within a documentation department as well as for consumers outside of the department.

There are many ways to implement a metadata hierarchy in accordance with an embodiment of the present invention. For example, a treelike interface may be designed to help focus searches for content. Since some vocabulary entries can be found in more than one location on the vocabulary "tree," and the metadata entry inherits the relationships of all of its parents on the tree, it is advisable for the author to: discriminate among identical vocabulary entries and choose the one in the hierarchy that applies to the content being authored; and select and apply the metadata entry furthest down the tree that applies to the content being authored.

In the example above, a general content type or MRU instance about AAA employed in IP security would have the metadata entry "AAA" applied. A more specific content type instance or MRU about AAA Authorization would have the metadata entry "AAA Authorization" applied.

Within an embodiment of the present invention, a user interface, e.g., graphical user interface (GUI), allows a content contributor to tag (or associate) metadata to a given content object instance or a collection of content object instances. Additionally, the user interface of the present embodiment may be implemented outside or inside of an XML tool. Since a content creator becomes for all intents a content consumer when he or she is searching for content to reuse, the interface used by content consumers to find content and build virtual documents may be exactly the same as that used by content creators to tag metadata to that content.

In operation, the user interface of applying metadata may function in different ways in accordance with the present embodiment. For example, a content author (or writer) may select one or more instances of MRUs, content types, or virtual documents, and selected a menu item to tag these items with indexing metadata. For instance, the content author may select from a picklist 100BaseT, that is the child of Fast Ethernet, that is the child of LAN Interfaces, that is the child of Interfaces. The content creator may then apply that selected metadata to the content object instances. As such, the content has been tagged with four metadata values: 100BaseT as well as all of the parents of 100BaseT.

In a user interface (e.g., GUI) in accordance with an embodiment of the present invention, content consumers may be presented with more options than content authors. For example, content consumers may be able to specify content description metadata in the same way that creators can, but they may also specify content description metadata in order to find a specific kind of content type. In the case of content authors, the DTD for the content they are working with defines the content type. Furthermore, "formatting" and "view" tabs may be designed for the interface to provide content consumers with options for formatting and delivering their virtual documents. However, these options would not be relevant to content creators acting in the role of content consumers. Options on these tabs may include output file format, style sheet options, possibly internationalization options, sort order, among others.

Within one embodiment of the present invention, the Component Object Management System (COMS) may be designed to work almost exclusively with virtual documents consisting of a number of MRUs assembled according to a DTD. In this case, the indexing metadata associated with a virtual document reflects the union of all the metadata associated with its constituent MRUs.

Figure 7:
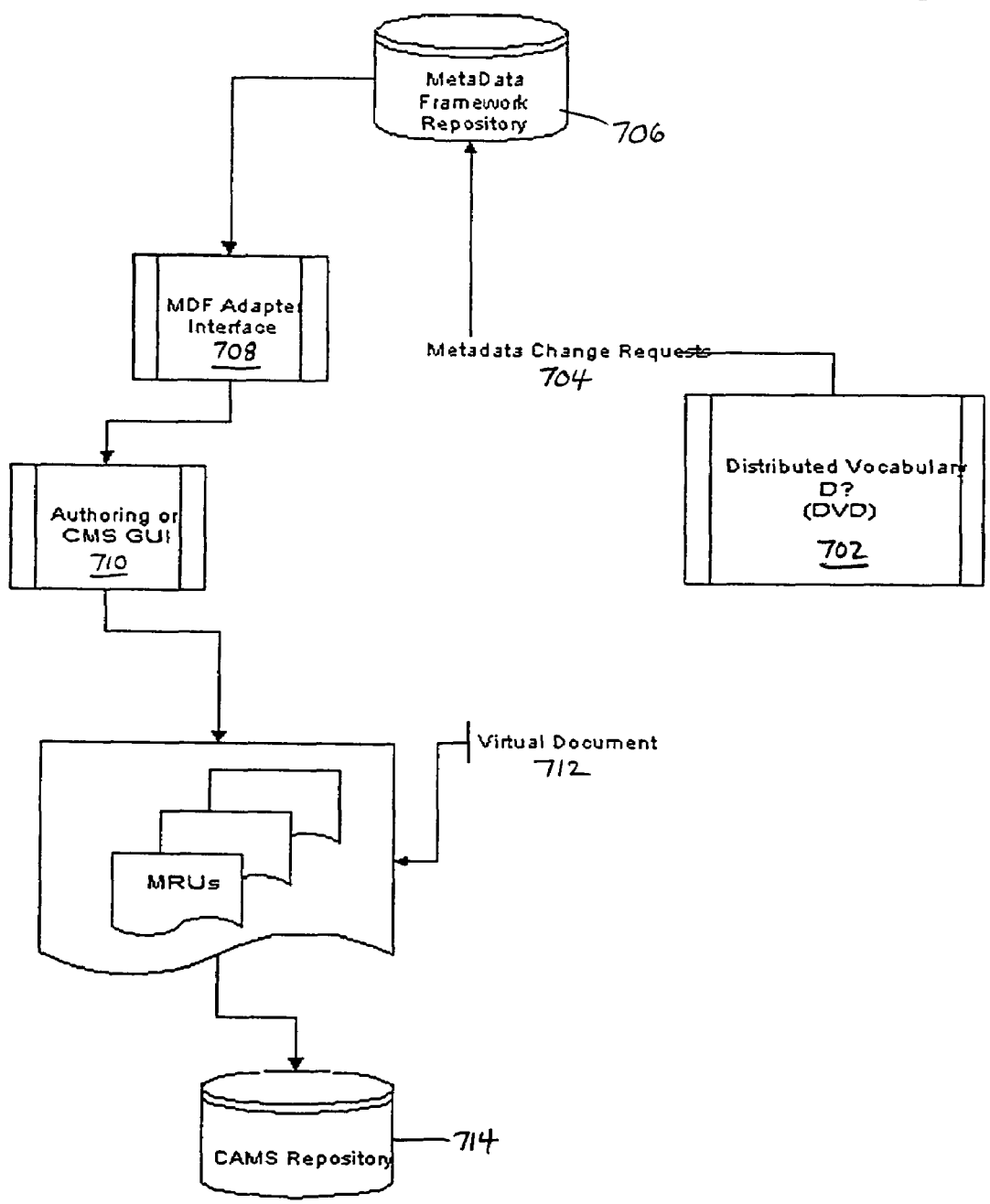
FIG. 7 is a block diagram of one embodiment of metadata flow for content contributors in accordance with the present invention.

FIG. 7 is a block diagram 700 of one embodiment of metadata flow for content contributors in accordance with the present invention. MRUs are associated with one another by virtue of the values of the metadata tags that are applied to the content of each MRU 712. This metadata association in turn provides the system with the necessary contextual information necessary to assemble a virtual document. Authors and others apply the metadata tags using, but not limited to, a GUI interface linked to a repository of metadata terms 710 via a standard application programming interface (API), e.g., MDF Adapter Interface 708. The terms themselves are managed in a database (e.g., the Metadata Framework Repository 706). This Distributed Vocabulary Development system 702 provides the necessary transactional and management support to allow users to create, modify, and delete metadata terms without also having to alter any MRU content that may have been tagged with these values. Change requests 704 are mediated via a transaction based API to the Metadata Framework Repository 706. Metadata values are associated with MRU content objects relationally by virtue of an arbitrary, unique identifier, this relationship being persisted in the Content Authoring and Management System (CAMS) repository 714. Thus, changes to the Metadata definitions concomitant changes in the other any content which may be associated with that item. Isolation of the metadata from the XML content is one of the key features of this present embodiment.

In step 308 of FIG. 3, the present embodiment organizes all of the relevant information associated with the search request in order to provide it context. It is understood that the metadata associated with the information may include organizational information thereby enabling the present embodiment to organize the relevant information. For example, a metadata of a piece of information may indicate that it is associated with another piece of information. Furthermore, the metadata may also indicate that its piece of information is to precede or follow one or more specific pieces of information.

At step 310, the present embodiment provides the relevant contextualized information to the requesting computing device. The present embodiment may include formatting with the relevant contextualized information before providing it to the computing device. For example, the relevant contextualized information may be formatted as an electronic "book". It should be pointed out that the present embodiment may provide the relevant contextualized information to the computing device in a wide variety of ways in accordance with the present invention. For example, the present embodiment may provide the relevant contextualized information to the computing device as an XML file. It is understood that XML provides one way to share data independent of software and hardware.

In step 312 of FIG. 3, the computing device receives the relevant contextualized information and renders it in order to produce an electronic "book" or virtual binder corresponding to the submitted search request. It is understood that the relevant contextualized information may be rendered into a wide variety of formats in accordance with the present invention. For example, the relevant contextualized information may be rendered into, but is not limited to, PDF, HTML, Wireless Application Protocol (WAP), among others.

Figure 8:
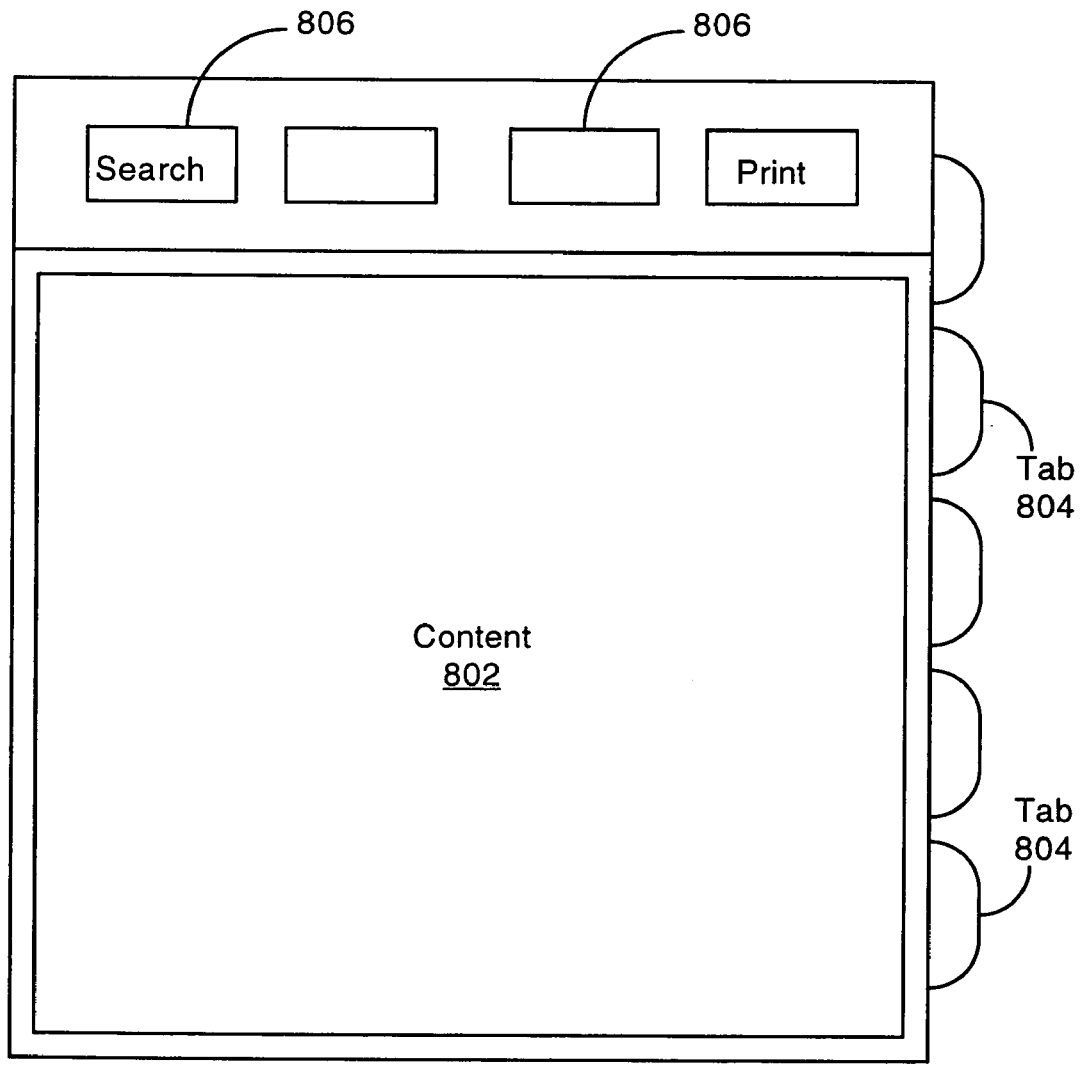
FIG. 8 is a diagram illustrating one embodiment of an exemplary electronic "book" or virtual binder in accordance with the present invention.

FIG. 8 is a diagram illustrating one embodiment of an exemplary electronic "book" or virtual binder 800 in accordance with the present invention. The virtual binder 800 enables the computer user to read the relevant information retrieved from the information database based on his or her search query. Specifically, it includes tabs 804 which may have different topics derived from the search query written on them. These tabs 804 may be selected by the computer user in order to access and view that corresponding information in a content area 802. Furthermore, the virtual binder 800 may include one or more function buttons 806 that may be utilized with the gathered and organized information. For example, one of the buttons 806 may be a search button (as shown) that enables the user to perform a search function on the received information. Additionally, one of the buttons 806 may be a print button (as shown) that enables the user to print out the gathered and organized information in a more traditional "book" format for use or distribution to others.

Figure 9A:
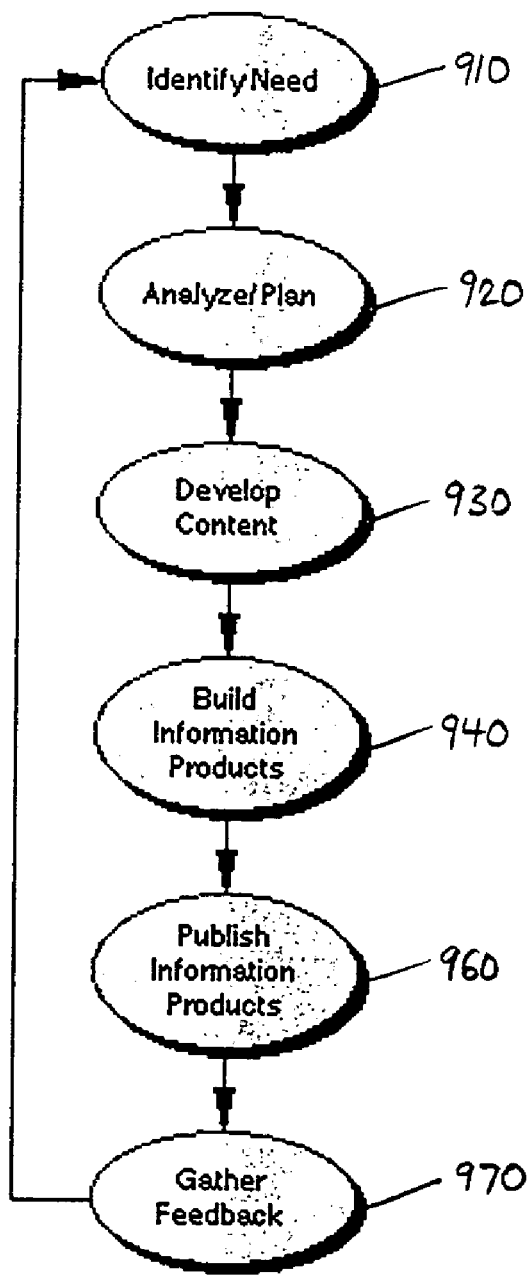
FIGS. 9A-9F are workflow and process diagrams intended to show exemplary processes that may be utilized to develop and produce information products at two levels of granularity in order to provide a user-customizable electronic "book" or document.

FIGS. 9A-9F are workflow and process diagrams intended to show exemplary processes that may be utilized to develop and produce information products at two levels of granularity in order to provide a user-customizable electronic "book" or document. FIG. 9A is a workflow and process diagram 900 illustrating a highest level of the process flow. The remaining FIGS. 9B-9F illustrate the breakdown to the next level of the process steps shown in FIG. 9A. Although specific steps are disclosed in FIGS. 9A-9F, such steps are exemplary. That is, the present embodiment is well suited to performing various other steps or variations of the steps recited in FIGS. 9A-9F. Within the present embodiment, it should be appreciated that the steps of FIGS. 9A-9F may be performed by software, by hardware, by humans or by any combination of software, hardware and/or humans.

Within FIG. 9A, the present embodiment is a first level process 900 for component architecture information development in order to provide a user-customizable electronic "book" or document. Specifically, at step 910, the present embodiment identifies the need for new and changed documentation within different situations. In step 920, the present embodiment analyzes and plans how the new and/or changed documentation may be implemented within a dynamic document system (e.g., 300). At step 930, the present embodiment develops the component architecture structured content (e.g., new and/or changed) to be implemented within the dynamic document system. In step 940, the present embodiment builds structured information products for the dynamic document system. At step 960, the present embodiment publishes the structured information products for review and tuning. In step 970, the present embodiment gathers feedback corresponding to the review and tuning of the published structured information products. Once step 970 is completed, the present embodiment proceeds to the beginning of step 910 to repeat process 900.

It should be noted that within FIGS. 9B-9F, stewardship roles are shown at the right of a step (or task) indicating the roles that may participate in the task. Additionally, the role shown in boldface may be the role with "ownership," or responsibility for ensuring that the task is completed according to plan.

Figure 9B:
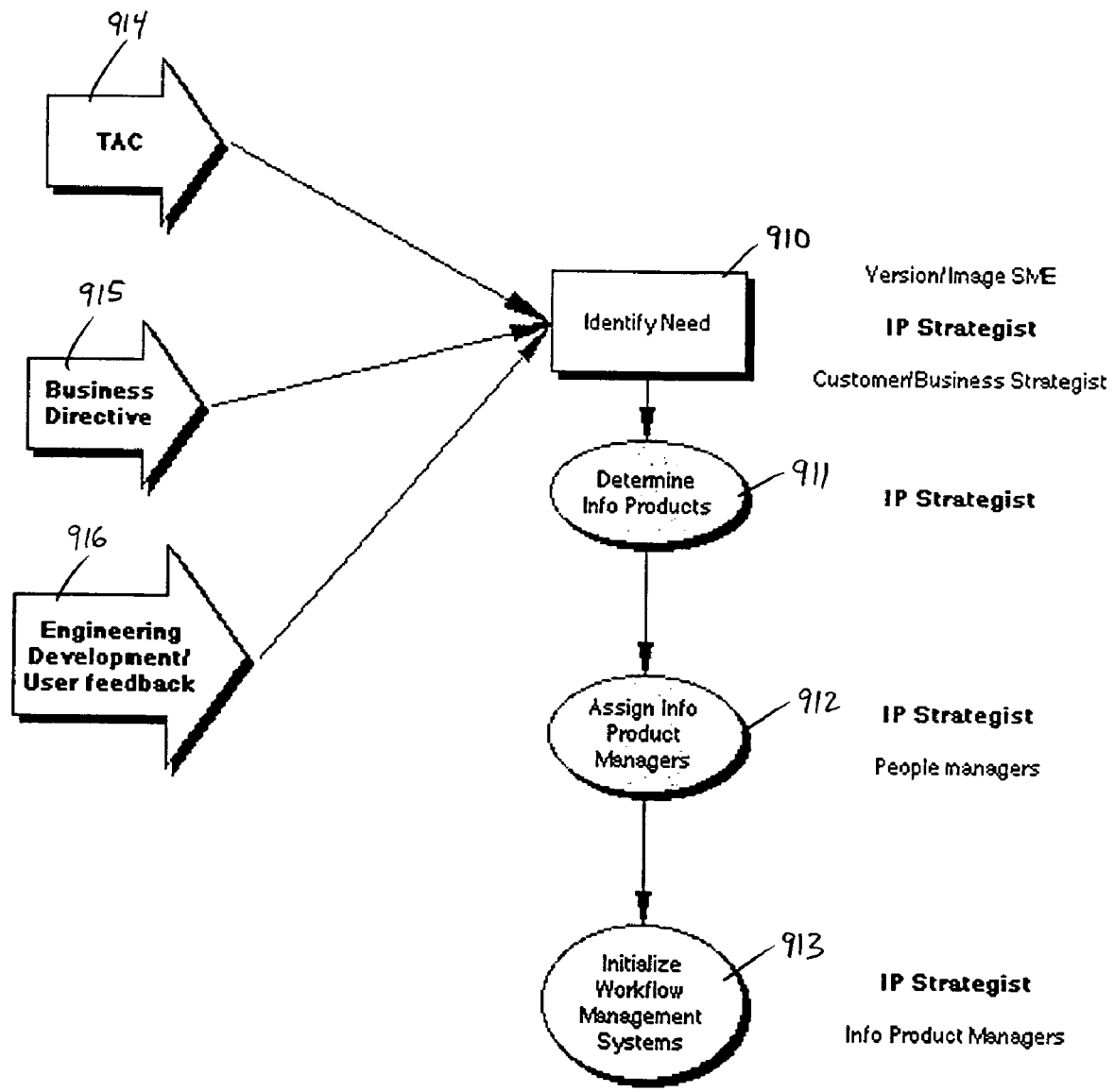

FIG. 9B is a flowchart of exemplary steps associated with step 910 wherein the present embodiment identifies the need for new and/or changed documentation within different situations. Specifically, influence 914 represents technical assistance center that may directly identify a need at step 910 for new and/or changed documentation within the dynamic document system. Furthermore, influence 915 represents one or more business directives that may be handed down from an upper management of a company or corporation that may identify a need at step 910 for new and/or changed documentation within the dynamic document system. Additionally, influence 916 represents engineering, development, and user feedback that may identify a need at step 910 for new and/or changed documentation within the dynamic document system. It is appreciated that the stewardship roles of Version/image SME, Information Product (IP) Strategist, and Customer/Business Strategist (described herein) may be involved with step 910 and that the IP Strategist may be the role responsible for the completion of that tasks.

At step 911 of FIG. 9B, the present embodiment determines what information products should be developed in order to satisfy the identified needs for new and/or changed documentation within the dynamic document system. The IP Strategist may be the stewardship role for step 911 and may also be the role responsible for the completion of that task. In step 912, the present embodiment assigns the information products to managers to delegate the creation of new and/or changed documentation for the dynamic document system. The IP Strategist and People Managers may be the stewardship roles for step 912 and the IP Strategist may also be the role responsible for the completion of that task. At step 913, the present embodiment initializes the workflow management systems in order to start the process of creating new and/or changed content for the dynamic document system. The IP Strategist and Information Product Managers may be the stewardship roles for step 913 and the IP Strategist may also be the role responsible for the completion of that task. After the completion of step 913, the process of FIG. 9B is exited.

Figure 9C:
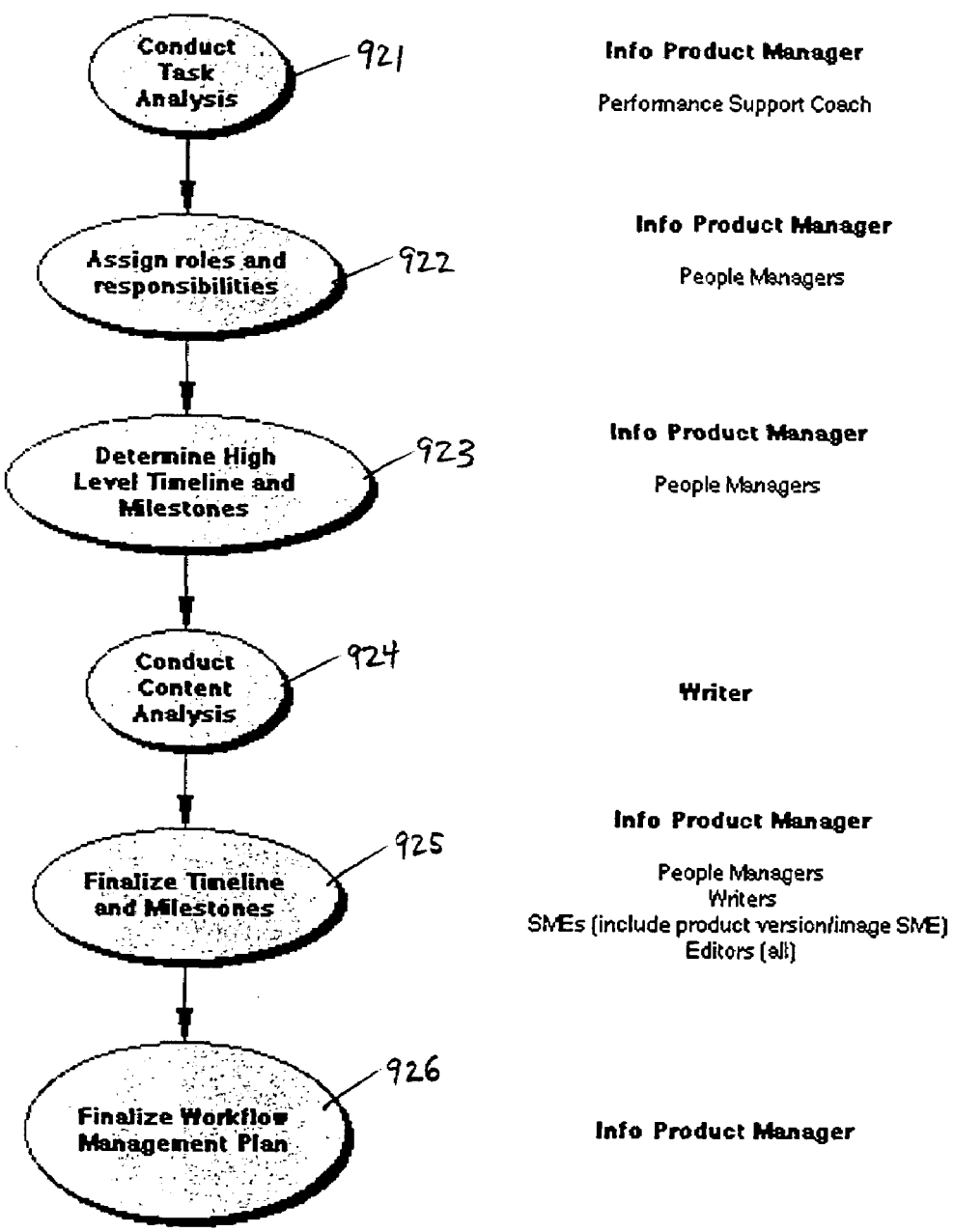

FIG. 9C is a flowchart of exemplary steps associated with step 920 wherein the present embodiment analyzes and plans how the new and/or changed documentation may be implemented within the dynamic document system (e.g., 300). Specifically, at step 921, the present embodiment conducts a task analysis as to what tasks need to be performed in order to produce new and/or changed documentation within the dynamic document system. The Information Product Manager and Performance Support Coach may be the stewardship roles for step 921 and the Information Product Manager may also be the role responsible for the completion of that task. At step 922, the present embodiment assigns roles and responsibilities associated with the results of the task analysis at step 921. The Information Product Manager and People Managers may be the stewardship roles for step 922 and the Information Product Manager may also be the role responsible for the completion of that task.

In step 923, the present embodiment determines a high level timeline and milestones that need to be met by those assigned roles and responsibilities at step 922. The Information Product Manager and People Managers may be the stewardship roles for step 923 and the Information Product Manager may also be the role responsible for the completion of that task. At step 924, the present embodiment conducts a content analysis to determine the information that may be needed for the new and/or changed documentation content. The Writer may be the stewardship role for step 924 and may also be the role responsible for the completion of that task. In step 925, the present embodiment finalizes the timeline and milestones that need to be met by those assigned roles and responsibilities at step 922. The Information Product Manager, People Managers, Writers, SMEs (including product version/image SME) and all Editors may be the stewardship roles for step 922 and the Information Product Manager may also be the role responsible for the completion of that task. At step 926, the present embodiment finalizes workflow management plan so that the work proceeds smoothly. The Information Product Manager may be the stewardship role for step 926 and may also be the role responsible for the completion of that task. After the completion of step 926, the process of FIG. 9C is exited.

Figure 9D:
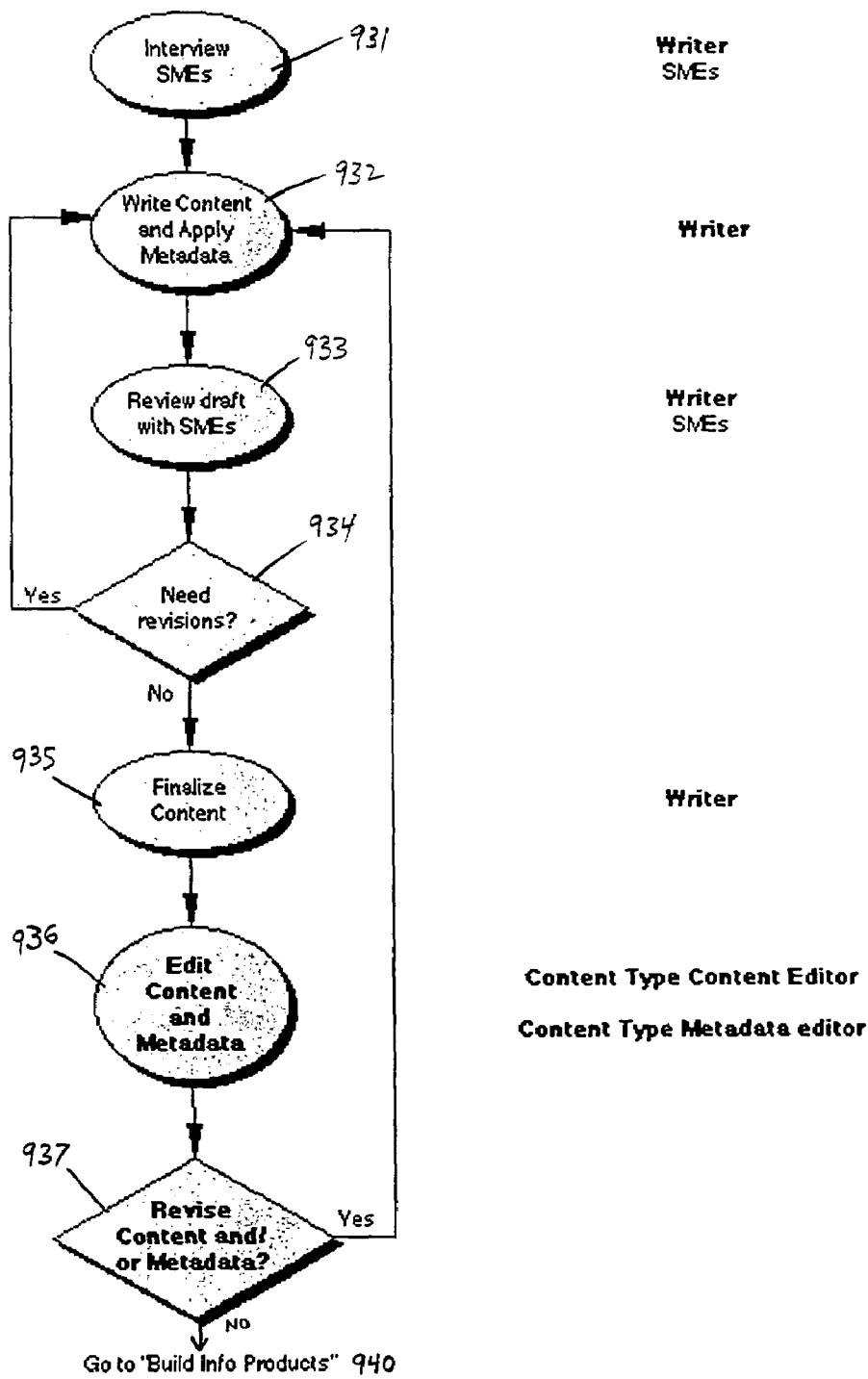

FIG. 9D is a flowchart of exemplary steps associated with step 930 wherein the present embodiment develops content for the new and/or changed documentation within the dynamic document system (e.g., 300). Specifically, at step 931, the Writer has an interview with the SMEs. The Writer and SMEs may be the stewardship roles for step 931 and the Writer may also be the role responsible for the completion of that task. At step 932, the present embodiment writes the content and applies (or associates) metadata with it. The Writer may be the stewardship role for step 932 and may also be the role responsible for the completion of that task. At step 933, the present embodiment reviews the draft with SMEs. The Writer and SMEs may be the stewardship roles for step 933 and the Writer may also be the role responsible for the completion of that task. In step 934, there is a determination as to whether the draft needs any revisions. If yes, then the present embodiment proceeds to step 932. However, if no revisions are needed at step 934, the present embodiment proceeds to step 935.

At step 935, the present embodiment finalizes the content. The Writer may be the stewardship role for step 935 and may also be the role responsible for the completion of that task. In step 936, the present embodiment edits the content and metadata. The Content Type Content Editor and the Content Type Metadata Editor may be the stewardship roles for step 936 and may also be the roles responsible for the completion of that task. At step 937, there is a determination made as to whether to revise the content and/or its metadata. If yes, the present embodiment proceeds to step 932. If no, the present embodiment exits process 930 and proceeds to step 940.

Figure 9E:
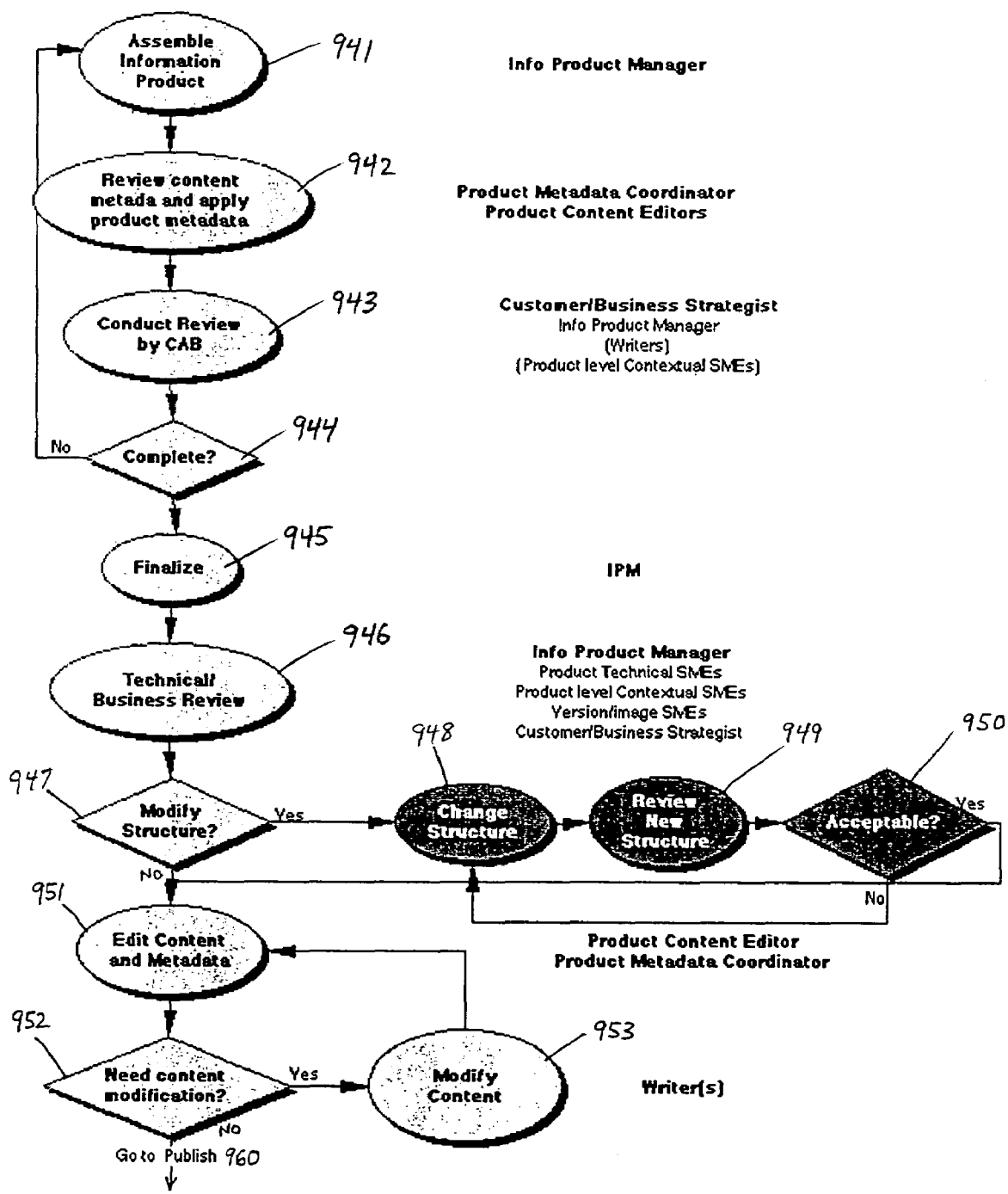

FIG. 9E is a flowchart of exemplary steps associated with step 940 wherein the present embodiment builds information products associated with the new and/or changed documentation within the dynamic document system (e.g., 300). It is appreciated that process 940 is like the test and revision of a software application, in that it requires iterative test/validation and revisions cycles. It may also involve reference to a design specification and to a functional specification, in a similar way that software application development usually requires. It is pointed out that in FIG. 9E, the process of testing begins with step 947.

At step 941 of FIG. 9E, the present embodiment assembles the information product. The Information Product Manager may be the stewardship role for step 941 and may also be the role responsible for the completion of that task. At step 942, the present embodiment reviews the content metadata and applies (or associates) product metadata. The Product Metadata Coordinator and Product Content Editors may be the stewardship roles for step 942 and they may also be the roles responsible for the completion of that task. In step 943, the present embodiment conducts a review by a Customer Advisory Board (CAB). The Customer/Business Strategist, Information Product Manager, Writers, and Product Level Contextual SMEs may be the stewardship roles for step 943 and the Customer/Business Strategist may be the role responsible for the completion of that task. At step 944, the present invention determines whether all of the information products have been completed. If not, the present embodiment proceeds to step 941. If yes, the present embodiment proceeds to step 945.

In step 945, the present embodiment finalizes the information products. The Information Product Manager (IPM) may be the stewardship role for step 945 and may also be the role responsible for the completion of that task. At step 946, a technical/business review may be performed by the Information Product Manager, Product Technical SMEs, Product Level Contextual SMEs, Version/Image SMEs, and Customer/Business Strategist. The Information Product Manager may have the role responsible at step 946 for the completion of that task. At step 947, the present embodiment determines whether to modify the structure of the Information Products. If no, the present embodiment proceeds to step 951. If yes, the present embodiment proceeds to step 948. At step 948, the Information Product Manager, Product Technical SMEs, Product Level Contextual SMEs, Version/Image SMEs, and Customer/Business Strategist may change the structure. The Information Product Manager may have the role responsible at step 948 for the completion of that task.

In step 949 of FIG. 9E, the Information Product Manager, Product Technical SMEs, Product Level Contextual SMEs, Version/Image SMEs, and Customer/Business Strategist may review the new structure. The Information Product Manager may have the role responsible at step 949 for the completion of that task. At step 950, the Information Product Manager, Product Technical SMEs, Product Level Contextual SMEs, Version/image SMEs, and Customer/Business Strategist may determine whether the new structure is acceptable. If no, the present embodiment proceeds to step 948. If yes, the present embodiment proceeds to step 951. At step 951, the Product Content Editor and the Product Metadata Coordinator edit the content and its associated metadata. In step 952, the present embodiment determines whether the content needs modification. If no, the present embodiment exits flowchart 940 to go to step 960. If yes, the present embodiment proceeds to step 953. At step 953, the Writers modify the content. The Writer may have the role responsible at step 953 for the completion of that task. One step 953 is completed, the present embodiment proceeds to step 951.

Figure 9F:
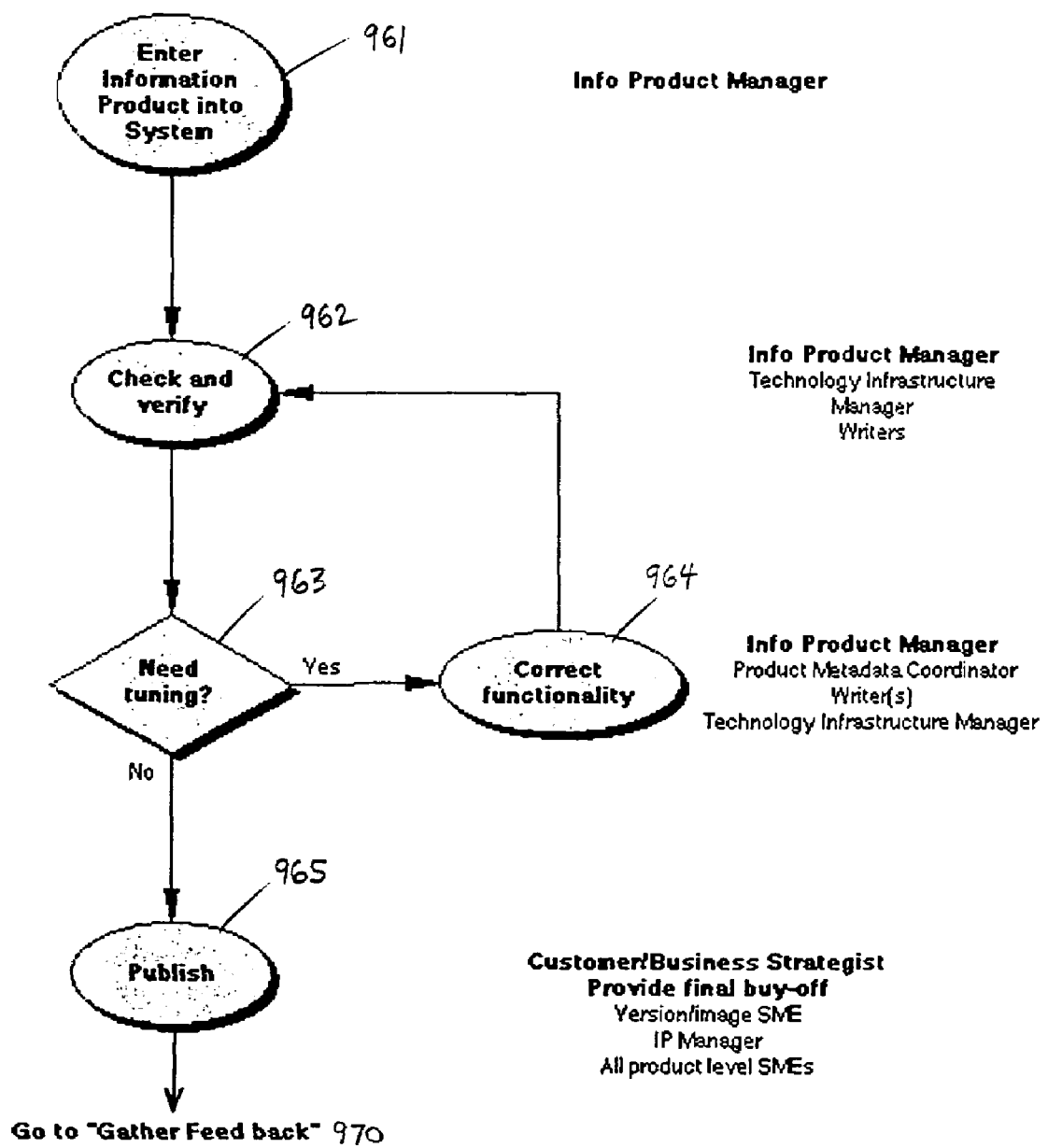

FIG. 9F illustrates the final test and verification of the end product of the dynamic document system (e.g., 300). The responsible stewards ensure that the information product can be assembled into a user-configured electronic "book" or document, or into any of the formats specified for that information product in the planning phase illustrated in FIG. 9B. Specifically, at step 961, the present embodiment enters the information product into the dynamic document system. The Information Product Manager (IPM) may be the stewardship role for step 961 and may also be the role responsible for the completion of that task. At step 962, the present embodiment checks and verifies that the entered information product operates properly. The Information Product Manager (IPM), Technology Infrastructure Manager and Writers may be the stewardship roles for step 962 and the Information Product Manager may be the role responsible for the completion of that task.

In step 963, the present embodiment determines if the information product needs tuning or is working properly. If it does not need tuning, the present embodiment proceeds to step 965. If it needs tuning, the present embodiment proceeds to step 964. At step 964, the Information Product Manager, Product Metadata Coordinator, Writer(s), and Technology Infrastructure Manager may correct the functionality that needs to be tuned up. The Information Product Manager (IPM) may be the stewardship role for step 961 and may also be the role responsible for the completion of that task. Once step 964 is completed, the present embodiment proceeds to step 962. At step 965, the present embodiment publishes the information product. The Customer/Business Strategist, Version/Image SME, IP Manager and all product level SMEs may be the stewardship roles for step 965 and the Customer/Business Strategist may provide the final buy-off and be the role responsible for the completion of that task.

Within one embodiment in accordance with the present invention, a steward has a responsibility to one or more specific information object instances. These responsibilities are defined as roles within the present embodiment. A role is not equivalent to a job or job description. Instead, a person may fill one or more roles and thus have multiple stewardship responsibilities. In this manner, a writer or editor may have many different stewardship roles (responsibilities) to different books and chapters, and fills additional roles within the development process. In other words, the writer or editor may already "wears many hats." In summary, a stewardship role is not a person, but a set of responsibilities. A stewardship role has specific responsibilities. A person may have more than one stewardship role. A person may fill that stewardship role with regard to many content object instances. More than one person in a department may fill the same stewardship role, but not with regard to the same content object.

Within the present embodiment, there are four types of stewards: Content Stewards, Product Stewards, Global Stewards, and Infrastructure Stewards. For example, the Content Stewards have responsibilities that apply to individual content objects (content type instances), such as procedures, concepts, examples, and others. The Product Stewards have responsibilities that apply to information products (and, in some cases, information modules). The Global Stewards have responsibilities that apply to all of the output of the department. The Infrastructure Stewards have responsibilities that are to the supporting infrastructure, such as the technology, tools, and training required to maintain the processes.

Within an embodiment in accordance with the present invention, the Content Stewards include several exemplary stewardship roles (e.g., Writer, Content Editor, Content Metadata Editor, Technical SME, Contextual SME, and Content Performance Support Coach) which include an exemplary list of responsibilities assigned to each stewardship role. For example, the Writer's exemplary responsibilities may be to:

Manage own time/project timeline.
Lead content type development process.
Assist in scoping information product timeline.
Research: conduct content analysis of existing content and specifications.
Interview SMEs, review draft content with SMEs.
Write content, revise as necessary.
Manage content type reviews.
Review content type instances produced by peers for same information product to ensure content integration and consistency.
Finalize content for publication after review; manage buy-offs.
Additional self-directed management of time and process development (including development prioritization, scheduling within timeline parameters).
Integrate maintenance assignments into a work schedule and obtain buy-off for schedule from Information Product Manager and People Manager.
Additional collaboration with peers, Information Product Manager and SMEs.
Alert Information Product Managers and Information Product Strategist of potential need for strategy and design change requirement.
Know and understand metadata and product strategy.
Participate in the Customer Advisory Board review.
Notify Metadata Coordinator and Metadata Strategist of potential need for changes required to metadata categories or strategies.
Participate in usability testing and help to resolve functionality problems.

Additionally, the Content Editor's exemplary responsibilities may be to:

Work with other editors to develop, maintain, and ensure consistent use of styles within and across content types.
Take responsibility for understanding ongoing product and metadata strategies.
Alert Metadata Coordinator and Metadata Strategist of potential need for changes to products and strategies.
Ensure that corporate and departmental usability standards are followed.
Provide content object edit.
Provide feedback to writers on edit.
Identify training needs for individuals and groups and work with Performance Support Strategist to provide training.
Provide mentoring to individuals to develop writing skills.
Assist in developing timeline.
Buy-off on timeline.

Furthermore, the Content Metadata Editor's exemplary responsibilities may be to:

Stay abreast of metadata standards within his or her department and corporation.
Review content type instances and check for compliance to standards for metadata application (corporate and departmental).
Work with writer to ensure that metadata corrections are implemented properly.
Notify Metadata Coordinator and Metadata Strategist of potential need for changes to metadata application standards.
Identify training needs and work with Performance Support Strategist to provide training.
Mentor individual writers in metadata concepts and application.
Assist in developing timeline.
Buy-off on timeline.

The Technical Subject Matter Expert's (SME) exemplary responsibilities may be to:

Review content type instances for technical accuracy and provide feedback.
Provides specific technical details and information that is needed for the writer to complete a content type instance (in the interview).
Notify his/her department that a code commit has generated a need for documentation action.
Assist with task analysis.
Assist with setting and finalizing timeline and milestones.
Buy-off on timeline and milestones.
Notify documentation department of required content changes that have been brought to their attention.

Additionally, the Contextual SME's exemplary responsibilities may be to:

Provide contextual content for creation and maintenance of content type.
Review content type with regard to product scope and content relationships with regard to customer applicability and perspective.
Assist with task analysis.
Assist in setting and maintaining the information product timeline.
Buy-off on timeline.
Participate in CAB review of information product (optional).
Notify documentation department of potential need for content changes.

Moreover, the Content Performance Support Coach's exemplary responsibilities may be to:

Provide mentoring and coaching for processes (task analysis, interviewing, etc.).
Assist in meeting management, consulting, and interviewing skills.
Assist in coaching writers for technology competence.
Act as "help desk" for writer questions on using tools.

Within an embodiment in accordance with the present invention, the Product Stewards include several exemplary stewardship roles (e.g., Information Product Manager, Product SMEs, Product Editor, Metadata Applications Coordinator, and Software Version/image SME) which include an exemplary list of responsibilities assigned to each stewardship role. For example, the Information Product Manager's exemplary responsibilities may be to:

Take responsibility for understanding ongoing product and metadata strategies.
Notify Metadata Coordinator and Metadata Strategist of potential need for changes in metadata categories or strategy.
Alert the Information Product Strategist and writers of potential need for changes to products or strategy.
Assess code change notification and make assignments to writers and copy to people managers.

Conduct task analysis with support of Information Product Strategist.

Manage Information Product timeline creation, buy-off, and ongoing maintenance.

Manager development process for Information Product.

Keep People Managers and Department Manager advised of product development status.

Assign peer integration review relationships.

Ensure proper integration of content types.

Establish priority value for products and content types and input from Information Product Strategist.

Enter timeline in process management system.

Initialize workflow management system.

Assign roles and responsibilities for an information product.

Determine timeline, set milestones, and obtain buy-off from all participants.

Assemble information product.

Assist in conducting CAB review.

Conduct information product technical and business review.

Assist in resolving information product structural problems.

Enter finished information product into system for publication.

Manage check and verification of new information product functionality, and drive any necessary tuning.

Report proposed timeline or milestone changes and work with people managers and others to make these changes.

Additionally, the Product SMEs' (may include Technical SMEs and Contextual SMEs) exemplary responsibilities may be to:

Ensure that one content type doesn't obviate or contradict another.

Provide review of information product completeness and proper content integration and relationships.

Provide final buy-off on information product.

Buy-off on timeline.

Participate in CAB review.

Review and provide final buy-off on information product.

Furthermore, the Product Editor's exemplary responsibilities may be to:

Work with other editors to develop, maintain, and ensure consistent use of styles within and across content types.

Take responsibility for understanding ongoing product and metadata strategies.

Alert Metadata Coordinator and Metadata Strategist of potential need for changes to products and strategies.

Ensure that corporate and departmental usability standards are followed at the product level and across the product, including creating checklists and guidelines as appropriate.

Provide feedback to Information Product Strategist, Knowledge Management Strategist, and Customer/Business Strategist on need for change information product structure.

Mentor content type editors to ensure consistency of edits.

Assist Information Product Strategist in establishing and maintaining cross-product style standards (visual design, chunking principles, and advanced organizers).

Work with Information Product Strategist and Customer/Business Strategist to create sample test cases and get usability requirements.

Perform product level edit to ensure consistency and integration within an individual information product.

The Metadata Applications Coordinator's exemplary responsibilities may be to:

Review and apply metadata within the information product to ensure correct application for the entire information product.

Provide frontline support to metadata editors on application of metadata to content types.

Work with other Metadata Editors and Metadata Coordinators to ensure consistent and relevant metadata application across products.

Notify Metadata Strategist of potential need for change to metadata strategy.

Stay abreast of corporate and departmental metadata strategy and standards.

Assist in developing timeline and buy-off when final.

Assist in tuning functionality of pre-publication product.

Resolve metadata inconsistencies within product.

Assist in verifying and testing functionality of pre-publication product.

Correct or assist in correcting metadata to ensure correct functionality.

Identify training requirements and work with Performance Support Strategist to develop and deliver required training.

Mentor Information Product Managers and metadata editors in metadata application and concepts.

Moreover, the Software Version/Image SME's exemplary responsibilities may be to:

Assist with strategic, long term project planning.

Notify his/her department of future version/image changes.

Identify need for creation and maintenance of an information product.

Review information product for version/image accuracy.

Review task analysis for completeness.

Assist in development of timeline and milestones for information product.

Provide final buy-off on timeline.

Ensure ongoing integrity of task analysis by monitoring version/image changes and notifying the Information Product Manager.

Provide final buy-off on the information product.

Within an embodiment in accordance with the present invention, the Global Stewards include several exemplary stewardship roles (e.g., Customer/Business Strategist, Global Version/image SME, Metadata Strategist, Information Product Strategist, and Knowledge Management Strategist) which include an exemplary list of responsibilities assigned to each stewardship role. For example, Customer/Business Strategist's exemplary responsibilities may be to:

Works with contextual SMEs at more granular levels.

Organize and manage Customer Advisory Board (CAB).

Manage usability testing for pre-publication information product.

Work with Information Product Strategist and product editors to develop test cases and usability requirements for specific information products.

Gather and analyze metrics for evaluating Knowledge Management Strategy's strategic value.

Communicate strategic value and contribution of Knowledge Management program through internal metrics analysis and competitive analysis.

Take responsibility for knowing and understanding Knowledge Management evolution and implementation strategy.

Develop PR and communications program of documentation department Knowledge Management program.

Drive execution of Knowledge Management PR and communications program.

Manage publication process and obtain buy-offs.

Make decision to deploy.

Furthermore, Global Version/Image SME's exemplary responsibilities may be to:

Ensure that all required new or changed content for a specific software version is identified and on the planning lists.

Maintain a view into the version/images of the future to ensure adequate planning.

Determine requirement for new content for each new software version.

Identify need for content changes in each new software version.

Moreover, Metadata Strategist's exemplary responsibilities may be to:

Research, identify, and resolve metadata-related issues across information products.

Ensure that resolutions are communicated and implemented appropriately (to Metadata Coordinators, Writers, and other documentation department personnel).

Ensure integration with other company metadata strategies as appropriate.

Investigate other metadata initiatives within company to assess impact on documentation department metadata strategy.

Identify and assist Performance Support Manager in providing training to writers, metadata editors, and coordinators.

Mentor metadata coordinators.

Assist in resolving of proposed structural changes to information products or content definitions.

Work with Knowledge Management Strategist to integrate practices of other contributing writing groups with regard to metadata.

Drive the design and development of DTDs.

Maintain DTDs and other definitions documents for all products, modifying them as required by structural changes.

Additionally, Information Product Strategist's exemplary responsibilities may be to:

Identify and manage the evolution of current information products and the creation of new products by working with documentation department personnel, other company employees and organizations, and company customers.

Balance requests for information products with associated costs and feasibility.

Provide ongoing communication about product strategy to entire documentation organization (roadmaps, product briefings, etc.).

Provide information for people managers for load balancing by monitoring all products and incorporating information from the Version/image SME, Customer/Business Strategist, and customer feedback.

Work with Information Product Managers and marketing Product Managers to establish product priority values.

Work with other company organizations and (through the Customer/Business Strategist), company customers to develop product solutions that reduce customer support costs (e.g., technical assistance center, training), address user requirements, and meet other ongoing company business objectives.

Work with the Customer/Business Strategist and product editors to develop test cases and usability requirements for specific information products.

Drive the determination of need for new/changed information product(s).

Assist in resolving proposed structural changes.

Assign information product managers to new or change information product(s).

Initiate workflow management system.

Drive resolution of proposed structural changes.

Work with the Knowledge Management Strategist to integrate practices of other contributing writing groups.

Mentor Information Product Managers to ensure common understanding of processes and structures.

Provide reporting of information product development and changes in timeline that affect the product delivery date.

Resolve load balancing issues with people managers.

The Knowledge Management Strategist's exemplary responsibilities may be to:

Stay abreast of knowledge management strategies and innovations in the knowledge management world, and explore ways to integrate new ideas.

Work with the Customer/Business Strategist to determine standards for measuring progress and to identify the benefits of the knowledge management strategy.

Drive the definition, implementation, and evolution of documentation department and knowledge management processes and strategy by working with other strategists and managers.

Ensure communication of documentation department knowledge management strategies and processes within documentation department and to other organizations within company.

Work with the Information Product Strategist to integrate practices of other contributing writing groups.

Explore ideas on how to integrate one content with that of other company writing groups.

Work with the Technology Manager to explore and improve functionality.

Drive the resolution of proposed structural changes.

Report results of measurements, integration efforts, and proposals for major improvements and integration with other company groups.

Propose and work with Performance Support Strategist and Customer/Business Support Strategist to develop and deliver training to documentation department personnel and to customers to ensure maximal use of the system and products.

Within an embodiment in accordance with the present invention, the Infrastructure Stewards include several exemplary stewardship roles (e.g., Technology Infrastructure Manager, and People Manager) which include an exemplary list of responsibilities assigned to each stewardship role. For example, the Technology Infrastructure Manager's exemplary responsibilities may be to:

Evaluate and test new tools

Manage development of new tools.

Upgrade and maintain existing tools, including administrative functions.

Participate in tools development world inside and outside company to ensure visibility of documentation department technology.

Communicate tools strategy to managers and strategists.

Work with all managers and strategists to identify technology needs and tool requirements.

Provide ongoing communication about technology strategy to managers and strategists.

Ensure consistent and appropriate evolution of documentation department tool strategy by assessing external and internal technology strategies.

Work with Performance Support Strategist to identify training requirements for ensuring the proper use of tools.

Assess tools requests with regard to costs and feasibility.

Develop tools to implement authoring, retrieval, research, etc.

Participate in verifying (testing) and tuning the information product's functionality prior to publishing.

Furthermore, the Performance Support Strategist's exemplary responsibilities may be to:

Identify training requirements for all roles and arrange for appropriate learning support.

Provide/orchestrate learning opportunities and use of resources in support of knowledge management strategy as it evolves.

Assist people managers in mentoring staff and developing staff coaches.

Keep abreast of developments in learning methodology, technology, and opportunities and deploy within documentation department where appropriate.

Establish and maintain a learning strategy and plan for documentation department knowledge management.

Train coaches and ensure proper management of coaches.

Make performance support available to all personnel involved in the creation and management of content objects.

Identify, develop, and manage delivery of training for coaches in technology, knowledge management, and processes.

Establish guidelines and checklists for mentors and coaches.

Provide feedback to people managers of individual progress in training.

Additionally, the People Managers' exemplary responsibilities may be to:

Resolve conflicting information product development priorities for writers and editors.

Work with Performance Support Strategist and coaches to mentor personnel in knowledge management and skills growth.

Keep abreast of knowledge management evolution and implementation strategy.

Assist the Information Product Strategist in assigning Information Product Managers to information products.

Assist Information Product Strategist in assigning roles and responsibilities for each information product.

Assist in determination of high-level information product timeline.

Buy-off on high-level information product timeline.

Assist in finalizing detailed timeline and milestones.

Maintain a view of all direct reports to balance loads, schedules.

Report issues in load balancing and schedules to the Information Product Manager and assist in resolving timeline issues.

Work with the other people managers to assist in maintaining timelines and load balancing.

It is appreciated that there are many ways to implement an embodiment in accordance with the present invention. For example, there may be many different functional requirement groups (e.g., Administrative, Production, Content Creation, Content Management, Workflow, External Systems, Infrastructure Requirements, and Other Requirements) for implementing an embodiment of the present invention. Specifically, the Administrative group may include those functions related to the administration of the COMS system, including infrastructure which supports functionality in other groups. Additionally, the Production group may include those functions which translate content from the content repository to a delivery mode, for example, print, HTML, or PDF. The Content Creation group may include those functions which relate to the creation of content, including the authoring of new content and the assembly of existing content into Virtual Documents.

Moreover, the Content Management group may include the functions related to the management of content, including the assignment and management of metadata, and the organization of content in such a way to facilitate the quick and efficient location of content. The Workflow group may include the functions related to the automation of Business Practices and processes used by documentation department Documentation in the content production process. Furthermore, the External Systems group may include the functions related to integration with external systems which feed information into or consume information and content from the COMS system to other systems and entities which a documentation department may not control. Additionally, the Infrastructure Requirements group may include the requirements pertaining to integration and compatibility with existing company infrastructure. The Other Requirements group may include requirements which span or otherwise do not fit into one of the above categories. It should be understood that Internetwork Operating System (IOS) is used in an exemplary manner. As such, the present embodiment is not restricted to an implementation with IOS.

More specifically, the Administrative Functions (AF) may include different subsections, e.g., Command Management, (User, Group, and Access Management), and Content Creation Functions (CCF). For example, the Command Management may include:

AF-17 The system may include a separate but integrated application to manage, but not limited to, the IOS Command List. This application may not be dependent on content in the content repository.

AF-18 The system may allow for the importation of command information from Parse Tree Tools (PTTs) including allCmds the IOS Parse Tree Tool.

AF-19 The system may allow, via appropriate user interfaces and data management systems, for the association of each command extracted from the PTT output with one or more "as-documented" commands.

The division of the IOS parse tree into single commands is essentially arbitrary. It is possible for the division expressed in the output of a Parse Tree Tool to differ from that chosen by documentation department Documentation. For example, the PTT output may contain a command like:

IP <sec | auth | deny> <more syntax . . . . >

Documentation my choose to document this command as three separate commands, e.g.:

IP sec <syntax . . . >
IP auth <syntax . . . >
IP deny <syntax . . . >

When the PTT version of the command changes, the associated "as-documented" commands need to be easily identified.

AF-20 Given a PTT command or a set of PTT commands, the system may return all instances of content in the content repository which contain associated as-documented commands.

AF-21 The system may be able to compare 2 different versions of PTT output with the command database and identify those commands which have been added, deleted, or modified between the 2 versions.

AF-22 The system may allow for the specification and configuration of attributes for each as-documented command.

AF-23 For each as-documented command, the system may be initially configured with the following attributes, and with a means for viewing and modifying them: Command Name, FID, FID Short, CLI Mode, Component/subsystem, IOS Technology Group, Associated Features, Associated Technology, Associated Platforms, Release(s), Platforms, Related Commands, Command Status (e.g., active, deprecated, eliminated, or in development), See Also (Pointers to associated content other than commands).

AF-24 The system may manage all of the keywords, arguments, and other elements of Command Syntax in order to track changes at this level.

Additionally, the User, Group, and Access Management may include:

25 The system may allow for the creation of roles corresponding with, but not limited to, the roles and stewards outlined in <<>>of this document.

AF-26 The system may accommodate a minimum of 20 different roles.

AF-27 The system may allow for the assignment of people to one or more of these roles.

AF-28 The system may provide configurable security based on these roles. At a minimum:

Access to configuration data and interfaces.

Access to DTDs, CSS, XSLT and other content configuration data.

Access to workflow views.

Ability to edit content (i.e., ownership of content).

AF-29 The system may integrate with company's LDAP directory and derive all information about workers, with the exception of documentation department specific information, from LDAP.

The Content Creation Functions (CCF) group may include:

CCF-1 IOS Commands may be managed as content elements.

CCF-2 The system may detect inappropriate content and/or style for a content type and enforce rewriting.

For Example, in step-by-step instructions, the instruction should be driven by a non-"ing" verb at the beginning on the approved verb list. Exceptions to this rule should be flagged.

CCF-3 The system may provide automated picklists for metadata tagging automatically generated for the particular permissions (granted per steward role) and editing view being used. The values in these picklists may be derived from the MDF data.

CCF-4 The system should absolutely prevent the application of duplicate metadata to a single content object.

CCF-5 The presentation of metadata in the user interface should reflect whatever hierarchy is present, e.g., via a tree-view, nested lists, etc.

(e.g., IP→IP Connectivity→IP over ATM)

CCF-6 The system may provide a WYSIWYG (what you see is what you get) style sheet editor.

CCF-7 The system may allow stewards to search for related content using keyword, metadata, and contextual natural language search.

CCF-8 The system may automatically search for similar content and recommend reuse, and prompt the author to select existing instances rather than create new instances if appropriate.

CCF-9 The system may provide full-featured, robust, WYSIWYG editing environment. WYSIWYG in this instance means according to any of the defined style sheets.

CCF-10 Does not allow embedded format; style definitions and content are separated.

CCF-11 Provides stewards ability to turn content element display on or off while editing based on tagging.

CCF-12 Supports following view and edit modes:
 a—Raw XML
 b—WYSIWYG for all output modes
 c—Content with tags
 d—Hierarchical/structured graphical view.
 e—Supports tables, including same functionality as FrameMaker.
 f—Supports the following DTD-Related Requirements:
 g—Strict DTD enforcement.
 h—Graphical presentation of DTD.
 i—Simultaneous display of insertion point and selection in content and DTD.
 j—Roles or user-profile based controlled access to DTDs, views, and picklists for metadata.
 k—Graphical DTD building tools.
 l—Ability to create "nested" DTDs for any level of granularity (e.g., within an element, of elements within a content type, of content types within an information product).

CCF-13 The system may support including all MIME-compliant objects in content, including graphics, video, and other multimedia content.

CCF-14 The system may support user-defined variables/entities with access from configurable picklists based upon the DTD and user profile.

Variables in this case are symbols which are resolved to some value at production time. Users need to be able to manage (create/view/modify/delete) them with appropriate user interfaces. Access to the ability to create/modify/delete variable definitions needs to be limited according to role.

CCF-15 The system may provide a mechanism for annotating content using industry standard symbol libraries.

CCF-16 Editing may be done by 1 or more editors on a single copy of the content accessed from the CMS. Static copies of the content are not allowed.

CCF-17 The system may allow simultaneous annotation and review of any content object.

CCF-18 The system may support automatic tagging according to steward-defined keyword lists (e.g., glossaries, technology lists).

The system should feature a user configurable "glossary". When words in this glossary appear in the text, they should be tagged appropriately. This tagging can take place in real-time, at check-in, or in batch mode in periods of low use.

CCF-19 The system may support importing of unstructured content from major formats, including, but not limited to FrameMaker, Microsoft Word, ASCII Text, RTF, Excel.

CCF-20 Supports mapping of FrameMaker template tags to DTD entity definitions.

CCF-21 The system may be "aware" of when the user is editing a command entity.

CCF-22 Picklists of appropriate keywords/arguments should be available.

CCF-23 The system should not present a keyword or argument as available in a picklist if it has already been used in the command content at hand.

CCF-24 If the system finds a command not in the system, a process needs to be initiated to review the command and determine whether or not it should be added to the system, or if it represents a typo, a spurious command, or an improper division of a PTT command into ADCs.

CCF-25 The system may validate all commands in a given command object to determine whether:
 a—The command exists in the Master Command Database.
 b—The command is properly formatted.
 c—Keywords/arguments specified for the command are valid.
 Validation can occur in real-time, on demand, or as a batch process.

CCF-26 The system may provide a means of easily accessing the content that contains any commands returned by the above validation process.

CCF-27 The system may provide versioning for commands in the same manner as for IOS Content.

The Content Management Functions (CMF) group may include several subsections (e.g., Content Management, Versioning, Editing and Annotation, Linking and Link Management, Search and Content Access, Content Assembly, Content Identification Metadata Management, and Content Description Metadata Management). Specifically, the Content Management may include:

CMF-1 The system may provide a means for searching for content using a combination of CIM and CDM.

CMF-2 Content may be returned by search in such a way that it is available for viewing, editing, and Use By Reference as appropriate by a drag and drop mechanism.

CMF-3 The system may store annotation data separately from content objects.

CMF-4 The system may scale to any size or complexity of content element, information product, or number of users.

CMF-5 The system may be independent of geography or network topology.

CMF-6 The system may accommodate changes to network topology or other hardware changes gracefully.

CMF-7 Should support levels of annotation indexed by userID, date, and position in workflow.

CMF-8 Supports user development of custom reports.

CMF-9 Supports ability to structure, organize, define reports, and restructure (if necessary) the repository.

CMF-10 Provides a centralized source for permissions/profiles based upon roles.

Additionally, the Versioning may include:

There may be a need to track document revisions in the context of its release for which they were originally intended. One way to accomplish this would be to track content versions using the document's release and revision reference numbers. For example, for 11.3, the initial released version of the documentation would be 11.3.0. Subsequent modifications to the content would be labeled sequentially (e.g., 11.3.1, 11.3.2, etc.). In the meantime, however, new work may be ongoing on documentation for the next document release. Changes and revisions to documentation for one document release should not affect documentation for any other release. Within the following discussion, Version refers to an IOS Version or Release. A revision is a checked-in version of the docset, which always exists in the context of a Version. The Version may include:

CMF-11 The system may support the application of version labels at a given point in time across the entire content repository, or any subset thereof.

CMF-12 The system may allow for standard check-in/check-out work in progress versioning.

CMF-13 All content management and content creation sessions may exist in the context of a single IOS Release. Appropriate user interfaces may exist for users to select an IOS release in which to work before being given any access to content.

CMF-14 Changes to documentation associated with one IOS Release may not affect content associated with any other IOS Release.

CMF-15 The user interface should reflect the most recent revision of content for any given IOS Release.

CMF-16 System may allow the retrieval of a complete docset, or any subset of the docset, for any IOS Release.

CMF-17 By default, the system should select the latest work in progress version for the latest IOS Release.

CMF-18 The system may maintain a logical concept of the latest revision of the entire docset for a given IOS Release.

Across a docset, different content objects will have different revisions. For example, if there are 3 content objects associated with IOS Release 11.3, they may have versions like 11.3.1, 11.3.15, and 11.3.0. The system needs to be able to treat these different versions as all being members of the "latest" version.

CMF-19 The system may provide an interface for viewing all content revisions in the context of their associated IOS Release.

CMF-20 Reuse of content should be constrained to the current IOS Release, and train releases extending back to and including the last mainline IOS release.

CMF-21 Provides Check in/Checkout based upon object permissions.

CMF-22 Provides History of actions on an object.

CMF-23 Provides a graphical difference between any two versions.

CMF-24 Allows rollback (taking an old revision and making it the current revision).

CMF-25 Supports separate status attribute for each object—draft, review, final.

CMF-26 Supports quick check-in/keep checked out.

CMF-27 Supports annotation and comments applied to objects or groups of objects.

CMF-28 Supports automatic application of comments to objects or groups of objects based upon version SME requirements.

CMF-29 Read-only Get.

CMF-30 Maintains editing check-in check-out data separately from review check-in check-out.

CMF-31 Tracks a change to an element within a content type or a content type at the content type level.

CMF-32 Supports automatic notification if an object has been checked out longer than a user-specified length of time.

The Editing and Annotation may include:

CMF-33 The system may support a browser-based mechanism for reviewers and others outside of documentation department Documentation to view and annotate content.

CMF-34 The editing and annotation system may not require the installation of any software beyond a standard web browser.

CMF-35 The editing and annotation system may provide a "single-source" interface for editing and annotation. No copies of content are to be made or distributed to facilitate editing and annotation.

CMF-36 The system may provide a method for content creators and others to see what comments, edits and annotations were made, who made them, and when.

CMF-37 The system may display in the specified manner any number of edits and annotations by any number of reviewers.

CMF-38 The editing and annotation system may be completely integrated with the workflow system, such that the submission of completed reviews or edits are noted in the workflow system and can be used to trigger other events.

Linking and Link Management

Link management may involve the following types of links:

Use By Reference (UBR) which is a content "linked" into a virtual document.

See Also which links to other content within the documentation department repository.

Cross Reference is a link to internal content managed in the system.

Link to External content is a link to content in a system that documentation department does not control (e.g., content in CCIM).

Links from external content is a link from content in a system that documentation department does not control to content in the IOS COMS repository.

It should be pointed out that unless otherwise noted, the following requirements apply to all link types.

CMF-39 A UBR link may always resolve to the most recent revision within the scope of a particular software release.

CMF-40 The system may inform users when deletion of a content object will break a link.

CMF-41 The system may be aware of which objects participate in links.

CMF-42 The system may provide for on demand validation of links for any content object or group of content objects.

This functionality can also be implemented as a batch process.

CMF-43 The system may provide reports of link status, highlighting content with broken links.

CMF-44 The system may provide a mechanism for external content creators (non-IOS creators) to link to IOS content with at least the same functionality they enjoy now with CCIM.

CMF-45 The system may restrict the capability of copying content objects to users with the appropriate permissions.

CMF-46 The final proposal may include a strategy for maintaining cross references between content object instances.

For example, if a module in a virtual document has a cross reference to another module, should that module be required to be included in the virtual document? If not, how is the link resolved?

Additionally, the Search and Content Access may include:

CMF-47 Content creators should be able to search for content in the repository by any combination of content identification metadata, content description metadata, and content type. User interfaces may exist to support searching by metadata by picking metadata values from picklists and building queries graphically.

CMF-48 Content may also be retrievable by a natural language search.

CMF-49 Queries generated in accordance with CMF-47 above should be savable and reusable.

The Content Assembly may include:

CMF-50 The system may provide a user interface for assembling Information Products by dragging and dropping appropriate modules into the IPM.

CMF-51 The system may provide a graphical user interface allowing content creators to link content by reference by dragging and dropping content or a label referring to that content into the appropriate part of their content.

Content Identification Metadata Management

Content Identification Metadata (CIM) may be those metadata which identify content objects. They are differentiated from Content Description Metadata in that they do not describe what the content in a content object is about. CIM tags typically follow the <tag>=<value>paradigm. Examples include revision, date created, status, etc. The Content Identification Metadata Management may include:

CMF-52 The system may allow for the configuration of Content Identification Metadata tags.

CMF-53 The system may allow for the inheritance of specified Content Identification Metadata tags by child objects of any container.

For example, if there are 6 CIM tags on the parent, it should be possible to instruct the system to apply some subset of those tags to any child objects.

CMF-54 The system may allow for the automatic assignment of CIM values where appropriate based on configurable rules.

For example, the system can be instructed to fill in the date created field whenever a new content object is created.

Content Description Metadata Management

Content Description Metadata (CDM) may be those values which describe what the content is about. In many ways they are closely analogous to index values. CDM values are those which content consumers may use to locate content in the repository. The true power of the search engine may be realized when users are able to combine CIM and CDM to find the type of content they want which contains the information they need.

CMF-55 The system may integrate with the Metadata Framework (MDF). Values for Content Description Metadata, as well as their relationships to each other, may be derived from the MDF repository.

CMF-56 The system may provide an interface to the MDF for adding or modifying metadata.

CMF-57 The system may allow for the assignment of hierarchical metadata to content objects. If a leaf node metadata value is assigned to a content object, that object may behave as if tagged with all of the parents of that leaf node metadata value.

CMF-58 The system may accommodate an arbitrary number of metadata values for each "tag".

CMF-59 Changes to the value of a particular metadata tag should not break the link between it and content tagged with that value.

CMF-60 CDM metadata may be stored in such a fashion that changes to either do not necessitate changes to the other.

The essence of CMF-60 and CMF-61 is that the values for a particular metadata tag will change. Consider the case of Feature. Features start off in life with code names, and their "official" names evolve constantly during development. We need to be able to tag content with the code name at the beginning of the development cycle, and then not be required to retag when the name of that feature changes.

Another case to consider is when the relationships between values change. For example, if something is tagged IP→Security→AAA→AAA Authorization, and then later on the hierarchy is changed to something like IP→AAA→Security→AAA Authorization, the change in hierarchy should not require any changes to the content or it's tagging.

Another way to put it would be to say that CDM and Content may be abstracted from one another.

CMF-61 The system may provide a graphical user interface for the management of metadata on any content object.

This includes: Viewing, Adding and removing CDM assigned to an object.

CMF-62 Container objects may inherit the union of CDM assigned to their constituent content objects.

CMF-63 The system may provide a mechanism for activating/deactivating metadata inherited in the manner outlined in CMF-62.

It is conceivable that the union of metadata may be overwhelmingly dense and redundant for a large container object. A method is necessary for manually untagging a container object without losing the relationships in the metadata with its child objects.

CMF-64 The metadata manually activated or deactivated according to CMF-63 may remain activated or deactivated when new child objects are added to a container.

CMF-65 If the removal of a child object also removes the last instance of a particular metadata value from a container object, users may be queried whether or not to remove that metadata object from the parent object.

CMF-66 Manual activation/deactivation of CDM on the parent object, or addition of CDM to the parent, may not affect CDM assigned to child objects.

The Production Functions (PF) group may include:

PF-1 The system may deliver HTML and PDF to CCO the Universe CD, and other targets which are current deliverables for documentation department.

PF-2 The system may allow the transmission of content in the appropriate format to manufacturing for production and delivery as hard copy.

The Workflow Functions (WF) group may include:

WF-1 The system may allow for the definition of a "palette" of workflow objects including roles, states, tasks, and milestones.

WF-2 The system may allow for the definition of template workflows, using the above objects, which can then be instantiated in specific instances for specific tasks.

WF-3 Nodes in template workflows may refer to roles.

WF-4 Individual instances of tasks may be assigned to specific people who are members of the appropriate role group.

WF-5 The system may allow for the arbitrary prioritization of tasks.

WF-6 Tasks may be color coded or otherwise distinctively marked to indicate their status and their priority.

WF-7 The workflow system may implement an "inbox/outbox" metaphor for each users tasks.

Users should see a prioritized list of tasks when they launch the workflow system. When they mark a task as complete, or otherwise indicate that they are "done" with that task at that phase, the task needs to "disappear" from their inbox and "appear" in the inbox of the appropriate person in the role assigned to the next step of the workflow.

WF-8 The system may maintain a history of workflow events, including all changes to workflow properties and it's travel through the workflow system. This may include an archive function for completed tasks.

WF-9 The system may provide a mechanism for persisting workflow statistical information, and provide an interface for designing and producing reports against this data.

WF-10 The system may provide an interface for entering the priority of a task (e.g., against a list of configurable priorities), an estimated duration, an estimated scope (e.g., number of pages), status, percent complete as well as actual duration and actual scope. These are the statistics that will be "rolled-up" depending on the level of the user viewing the workflow data.

WF-11 The system may allow for automatic notification if a task is not marked to a certain state within a configured amount of time.

Notification should be by one or more configurable methods, e.g., e-mail and some method of highlighting overdue tasks in the "inbox".

WF-12 The workflow system may allow for "rollup" views of tasks by individuals as well as groups of individuals.

For example, an individual contributor should be able to see all of their tasks, and also be able to see a "rollup" report summarizing the number and scope of tasks in their inbox. Managers should be able to see this same summary for all of the people they manage, as well as a "rollup" view of all the tasks for which they are responsible. Managers should be able to "drill down" to any level of granularity.

WF-13 The system may provide a hierarchical task structure. One task can own an arbitrary number of child tasks. Manipulating the properties of the parent tasks should apply the same changes to all of that tasks children.

For example, a "parent" task may be something like "Document Feature X". This task, in turn, is comprised of many different subtasks, as defined in its template. Managers at one level may need to manipulate the parent task in order to assign it to an Information Product manager. The IPM, on the other hand, may need to distribute subtasks to different workers.

WF-14 The system may provide some mechanism for assigning a workload or scope value to each task. This may take the form of estimated hours as well as number of modules, and number of pages.

WF-15 The system may provide security preventing workers from viewing information at a level above their position in the hierarchy unless configured to allow it.

WF-16 Reporting may feature a query mechanism allowing the inclusion and exclusion of tasks based on any of their properties (i.e., status, due date, priority, etc.)

WF-17 The system may allow for the arbitrary grouping of individual tasks or groups of tasks. These groups can then be managed as a single task.

WF-18 The reporting functionality may provide a means of summarizing the load values for tasks or groups of tasks.

WF-19 The system may provide a "load-balancing" interface, allowing managers to drag and drop tasks to different resources with a real-time view of the resulting change in workload for dependent resources.

WF-20 The system may provide a web interface for generating and viewing workflow reports. All security parameters may apply to the web interface.

This functionality is intended to allow people who don't have the workflow system installed to view tasks assigned to them. Examples of this sort of worker include engineers assigned for review, etc.

WF-21 By default, the web interface may recognize a user by their login and present to them their inbox, containing all the tasks and only those tasks for which they are responsible.

WF-22 Interface should include brief summary as well as more detailed description of each workflow item, similar to subject/text model in e-mail.

WF-23 Relevant application should be launched with relevant content from the workflow inbox user interface.

For example, if the task were to review a certain bit of content or a virtual document, then double-clicking on a particular row in the inbox should launch the editor associated with XML, or whichever tool is appropriate.

WF-24 Allows establishment of rules by which metadata tags are added automatically. e.g., date, modification, author, etc.

WF-25 Changes to metadata for a content instance, or to the rules for applying metadata, should result in notification of all stewards associated with that instance or with that content type.

WF-26 The system may support multiple annotations of any point in the workflow.

WF-27 The system may provide a graphical user interface for the configuration of workflow.

WF-28 The system may allow the editing of workflows created from templates without modifying the underlying template.

WF-29 The system may allow the saving of any workflow as a "template" workflow, which can then be used to instantiate new workflows.

We envision an interface that would allow managers to assign tasks from a pool of unassigned tasks to individual workers. Dragging a set of parent tasks over to a particular worker should also drag all of that tasks children as well.

WF-30 The system may expose a robust API allowing for integration with and automation by a Savvion based Business Process Automation application.

The Support System Functions (SSF) group may include:

SSF-1 The system may provide a schedulable backup/restore mechanism capable of restoring the entire repository in less than 12 hours.

SSF-2 The system may provide an interface for defining age thresholds for different types of content.

SSF-3 The system may inform the administrator when content passes these age thresholds, prompting the administrator to archive or delete the content, or move the content into a configured workflow queue for refresh.

The External Systems Functions (ESF) group may include:

ESF-1 The system may expose an API or other mechanism for allowing external users to access content in the repository via metadata and/or free text searches.

ESF-2 The system may prevent the delivery of unpublished information to external users, unless those external users are specifically given this capability.

ESF-3 XML delivered by the system to external consumers may contain all CDM tags. It is not necessary to update CDM tags after XML is exported from the system.

ESF-4 The final deliverable may include interfaces to the following systems:
 a—CCEWP b—CCIM c—DSD
 The Parse Tree Tools Parse Tree Tools examine the IOS source code and extract command information. They provide this information in a number of formats for use by external consumers, such as documentation department. The Parse Tree Tools may include:

ESF-5 The system may support the import and export of IOS command information to and from the repository and a UNIX file system (or other target) containing the output of allCmds (or it's successor tools).

ESF-6 The final system may include a DTD(s) which allCmds can use to output XML.

ESF-7 The system may provide a mechanism for writing content from the repository back into the XML stored in the file system where allCmds can access it.

The purpose of this requirement is to provide a way to "push" content developed by IOS writers back into the source code which allCmds parses.

ESF-8 The system may integrate with Feature Navigator/Fusion (or its successor tools) such that users can access content associated with selected FIRP combinations. ESF-9 The system may provide an interface into PDS and PIMS in order to allow writers to access these tools in the context of the content they are working on.

This requirement may be further refined and defined in a meeting with a "tiger team" of writers, editors and managers during the next phase of implementation.

The Infrastructure Requirements (IR) may include:

IR-1 The system may provide a mechanism for publishing content to existing company publishing infrastructure in such a way that these systems are unaware of any change from previous publishing procedures and practices utilized by documentation department Documentation.

IR-2 The system should demonstrate 99% uptime.

IR-3 All maintenance and upkeep functions should be accessible by GUI, as opposed to command line or native RDBMS utilities.

IR-4 All technologies may be capable of negotiating the company firewall where appropriate.

IR-5 Complete proposal may include definition of upgrade path and process, as well as scalability plan.

IR-6 Check in, Check out, and publishing performance should not degrade as the content base grows in size. Content transactions should take no more time than saving to a non-local disk on the network file system. In other words, network bandwidth, event at 100 Mbps, should be the gating factor in performance.

IR-7 Performance may be acceptable to dial-up users over 128 Kbps ISDN.

IR-8 Browser based functionality for the content authoring, content management, and publishing tools is not a specific requirement.

IR-9 May support Win9x, NT, and 2000.

IR-10 The system may pass a company load test with specifications and requirements to be finalized later with the participation of the company IT infrastructure team.

IR-11 The system may support 50 concurrent users without a significant degradation in performance.

IR-12 The system may pass review by the company IRW team and other IT infrastructure stewards as necessary.

The Other Requirements (OR) group may include subsection such as Documentation and Training, Conflict Resolution and Change Management. Specifically, the Other Requirements group may include:

OR-1 The system may allow for processor intensive tasks to be executed as batch processes according to a user configured schedule.

OR-2 Appropriate user interfaces and database support to implement may be part of the system.

OR-3 The final deliverable may include a process and necessary tools for porting legacy documentation department into the system.

OR-4 The system may feature a robust API, permitting automation in code of any user action. API should be in Java and/or COM.

OR-5 The system may permit access to the underlying Database via ODBC/JDBC, SQL+ or other RDBMS management tool outside of the application itself.

Additionally, the Documentation and Training may include:

OR-6 The final proposal may include complete use case diagrams, as well as data flow diagrams and data models for all aspects of the system.

OR-7 The system may include complete user documentation, as well as

OR-8 The system may include complete instructions for installing the system from scratch.

OR-9 The finished proposal should include provisions for training all users in the use of the system in the context of the appropriate role or roles.

OR-10 Documentation may include all modifications and customizations.

OR-11 The database schema and source code may be made available to company to enable company to maintain and update the system as necessary.

Warranty considerations can be made in the light of. Vendors may not be held accountable to company for modifications or work done by company without the participation of vendor.

Furthermore, the Conflict Resolution and Change Management (CRCM) may include:

CRCM-1 Each of the requirements in the final requirements document may be initialed by a representative of documentation department and Lighthouse Solutions (and other vendors, as appropriate).

CRCM-2 Disagreement regarding any of these requirements, or their relationships, may be resolved by conference call or physical meeting. CRCM-3 This document may be amended in such a way that the original information and its relationship to the change is preserved.

Another way to look at this is that requirements may be versioned.

CRCM-4 Removal or addition of requirements may be by mutual agreement following a phone conference or physical meeting. Removed requirements will be marked as removed but stay in this document.

CRCM-5 No requirement may be amended, removed, or added without documentation outlining its affect on use cases and other components of the design.

There are different ways to manage command data in accordance with an embodiment of the present invention. For example, commands may be tracked as both content and data. From the content perspective, the present embodiment may utilize extremely fine-grained control over the command object. The reason for this is that command syntax and FID shorts are nearly ubiquitous across all of the content. In addition, changes to syntax and FID shorts are fairly common, and these changes should be automatically reflected wherever the command appears.

It is understood that the present embodiment may be utilized with a wide variety of command data. For example, the following description is concern with Internetwork Operating System (IOS) commands. However, it is appreciated that these commands are exemplary.

The IOS command line interface (CLI) is a logical parse tree. It is designed to parse user input one token at a time according to a programmed set of rules. One of the tasks in documentation of the present embodiment is to make this parse tree understandable to human computer operators. For example, there are many commands which begin with the word (or token) "IP". Examples include: ip pim, ip pim accept-rp, ip pim border, ip tcp intercept one-minute low, ip tcp intercept one-minute high.

From the perspective of the parse tree, this may look something like this:

ip
   ---ip pim
   -------ip pim accept-rp
   -------ip pim border
   -------ip tcp
   -------ip tcp intercept
   ----------ip intercept watch-timeout
   ----------ip tcp intercept one-minute
   ----------------------ip tcp intercept one-minute low
   ----------------------ip tcp intercept one-minute high Note that in the case of the IP pim commands as well as the ip tcp intercept one-minute commands, each could have been written as a single command with a series of keywords, e.g.:

ip pim {accept-rp | border}
   ip tcp intercept one-minute {low | high}
   or even
   ip {tcp {intercept one-minute {high | low}}}

Taken to its logical extreme, you could represent all of these commands as a single syntax string:

ip {tcp {pim [accept-rp | border] | tcp [intercept {watch-timeout | one-minute {low | high]}}}}

The division between a command and its syntax may be completely arbitrary. As such, a documentation team may make that division according to what works best for the readers. Structure is imposed through the mechanism of rules. Rules may be fairly arbitrary in and of themselves. However, what's important is not necessarily that the rules be right in any universal sense, but that they be adequate and, above all, consistently applied. Here are exemplary rules for defining individual commands out of that universal IOS syntax string.

The engineering community has developed a number of tools which examine source code and produce output listing all the commands and their syntax in the code. Documentation department may accept the Parse Tree Tools output as being the correct division of a given command and its syntax. Conversely, documentation department may further divide a Parse Tree Tool Command (PTTC) into smaller subsets in order to produce more clear documentation. The COMS system should allow for this, and also for relating one or more of these As Documented Commands (ADCs) to its parent Parse Tree Tool Command. One of the reasons for all of this is to be able to compare two different versions of PTT output and identify commands which have been added, modified, or deleted between the two versions. In this manner, the affected content can then be easily found and corrected, as well as requirements for new content identified.

Attributes of a Command

| Attribute | Description |
| --- | --- |
| Name | The name of the command, derived according to the rules outlined above. |
| Label | The label for a command, which might be different than its name. For example, a label can accommodate parenthetical qualifiers, and can also provide a mechanism for associating arbitrarily broken out commands with a single source command. |
| Syntax String | The syntax string of the command. |
| Release | The release in which the command appears. |
| Platform | The platform(s) on which the command runs in this release. |
| Tech Area | The Documentation Technology Area within which the command belongs. |
| DE | The development Engineer(s) responsible for the coding of the command. |
| PM | The product manager(s) responsible for the development of the command (or more likely, the feature set(s) the command is a member of). |
| Feature | The feature(s) the command is a part of. |
| Status | The current status of the command, whether deprecated, replaced, etc. |
| Associated Commands | A list of commands which are associated conceptually or functionally with the command. |
| Replacements | Commands which may serve (in this release) as replacements for this command. |
| FID | The description of the command. |
| FID Short | The short description of the command. |
| NO | Boolean, whether or not there is a NO version of the command. |
| Hidden | Boolean, whether or not the command is hidden. |
| Component/subsystem | For IOS, the subsystem. |
| Component Version | The build version of the command's component. |
| Image | The marketed image name of the image(s) which contain this command. |
| Choices | Zero or more keywords, arguments, or keyword/argument pairs. |
| CommandID | Arbitrary unique id for this command. |

Commands, in turn, may sometimes be associated with arguments, keywords, and symbols. Collectively, the stuff that appears to the right of the command name are called Choices. Choices have only 2 attributes:
   Required Boolean, whether or not the choice is required or optional.
   Label The label by which we refer to the choice.

Arguments, Keywords, and symbols are all sub-types of choices. Because of this, they inherit the properties of choice, required and label. However, each has a unique set of characteristics all their own which serve to define and differentiate them.

Symbols are the simplest type of choice. They are literal characters which are required as part of an argument or keyword. Examples include the colon in <<I need that example Vicki used>>. Symbols have no additional attributes of their own.

Arguments, on the other hand, may be labels for values that should be supplied by the user. In essence, their values cannot be predicted by the writer except within certain broad ranges. Arguments have the following attributes:

| Attribute | Description |
| --- | --- |
| Default Value | The default value of the argument, if any. |
| Type | The type, e.g., String, Integer, IP Address, etc. |

-continued

| Attribute | Description |
| --- | --- |
| Required? | Is the argument required? |
| Unit | The unit (if any) with which the argument is delimited (e.g., seconds). |
| Constraint | Pointer to a constraint object that defines the valid values for this argument. |
| Length | The maximum length for the arguments (e.g., no more than 10 characters). |

Keywords are separate from arguments in that they are usually members of an enumeration. An enumeration is a list with a finite (usually quite small) number of values in it. So, to be a member of an enumeration means that your value has to be in the list. For example, in the following hypothetical command:

ip cef {foo | wombat | rutabaga}

The first choice, represented by the bracketed triplet, is a keyword. The enumeration has 3 members, foo, wombat, and rutabaga. Any other value for this choice is invalid. Keywords further differ from arguments in that they may themselves be followed by required keywords and/or arguments. In a sense, a keyword is basically an extension of the command structure. Again, the dividing line between a command and a keyword is essentially arbitrary. In the management system, keywords may not have an existence independent of their parent command. Keywords may have the following attributes:

| Attribute | Description |
| --- | --- |
| Name | The name of the keyword; its actual value in the enumeration. |
| Label | A label, if necessary, different from the above. |
| argument(s) | 0 or more arguments that may follow this command. |
| vales | Enumeration of values for this keyword. |
| KeywordID | Unqiue ID for this keyword. |
| Required? | Is this keyword required in the context of its parent? |

The constraints object is designed to encapsulate validation information for an argument.

| Attribute | Description |
| --- | --- |
| Name | The name of the constraint. |
| type | The type of the argument (e.g., String, Number, etc.). |
| value low | the low value (if appropriate). |
| value high | The high limit (if appropriate). |
| label | label for the constraint. |
| Description | A description of the constraint, e.g., "Any valid hostname of the network". |

Accordingly, embodiments of the present invention provide a method and system for enabling a computer user to more easily locate relevant information associated with a specific topic within a computer accessible database that includes a huge amount of information. Additionally, embodiments of the present invention provide a method and system which satisfies the above mentioned accomplishment and provide context for understanding the located relevant information associated with the specific topic.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented method comprising:
   establishing a database of information to include a plurality of text objects and a plurality of metadata associated with said plurality of text objects, wherein said plurality of metadata are associated with said plurality of text objects via a plurality of identifiers;
   receiving a search query associated with said database of information;
   retrieving a sub-group of text objects from said plurality of text objects using said plurality of metadata and said search query, said sub-group of text objects associated with a sub\-group of metadata from said plurality of metadata, in response to said receiving said search query;
   utilizing said sub-group of metadata to organize said sub-group of text objects, wherein said sub-group of metadata describes contextual relationships between said sub-group of text objects, and wherein the content of a metadata of said subgroup of metadata is altered without altering its associated text object of said sub-group of text objects, in response to said retrieving said sub-group of text objects; and
   collating the organized sub-group of text objects thereby producing an electronic book.

2. The method as described in claim 1 further comprising:
   downloading said electronic book to a remote computing device via a communication path.

3. The method as described in claim 1 wherein a text object of said plurality of text objects comprises a sentence of information.

4. The method as described in claim 1 wherein a text object of said plurality of text objects comprises a paragraph of information.

5. The method as described in claim 1 wherein said database of information comprises an extensible Markup Language (XML) file.

6. The method as described in claim 1 wherein said plurality of text objects are organized using a document type definition.

7. The method as described in claim 1 wherein said electronic book consists of a format selected from a Portable Document Format (PDF) and a Hypertext Markup Language (HTML).

8. A computer readable medium having computer readable code embodied therein for causing a computer to perform a method comprising:
   establishing a database of information to include a plurality of predefined pieces of information and a plurality of metadata associated with said plurality of predefined pieces of information, wherein said plurality of metadata are associated with said plurality of predefined pieces of information via a plurality of identifiers;
   receiving a search query associated with said database of information;

in response to said receiving said search query, retrieving a sub-group of predefined pieces of information from said plurality of predefined pieces of information using said plurality of metadata, wherein said sub-group of predefined pieces of information is associated with a sub-group of metadata from said plurality of metadata;

in response to said retrieving said sub-group of predefined pieces of information, utilizing said sub-group of metadata to organize said sub-group of predefined pieces of information, wherein said sub-group of metadata describes contextual relationships between said sub-group of predefined pieces of information, and wherein the content of a metadata of said subgroup of metadata is altered without altering associated predefined piece of information of said sub-group predefined pieces of information; and formatting the organized sub-group of predefined pieces of information thereby producing a virtual binder.

9. The computer readable medium of claim 8 wherein said method further comprising:

downloading said virtual binder to a remote computer device via a communication path.

10. The computer readable medium of claim 8 wherein a predefined piece of information of said plurality of predefined pieces of information comprises a sentence of information.

11. The computer readable medium of claim 8 wherein a predefined piece of information of said plurality of predefined pieces of information comprises a paragraph of information.

12. The computer readable medium of claim 8 wherein said database of information comprises an extensible Markup Language (XML) file.

13. The computer readable medium of claim 8 wherein said plurality of predefined pieces of information are organized using a document type definition.

14. The computer readable medium of claim 8 wherein said virtual binder consists of a format selected from a Portable Document Format (PDF) and a Hypertext Markup Language (HTML).

15. A system comprising:

a remote computing device;

a database of information comprising a plurality of text objects and a plurality of metadata associated with said plurality of text objects, wherein said plurality of metadata are associated with said plurality of text objects via a plurality of identifiers; and a server for receiving a search query associated with said database of information; retrieving a sub-group of text objects from said plurality of text objects using said plurality of metadata and said search query, said sub-group of text objects associated with a sub-group of metadata from said plurality of metadata, in response to said receiving said search query;

utilizing said sub-group of metadata to organize said sub-group of text objects, wherein said sub-group of metadata describes contextual relationships between said sub-group of text objects, and wherein the content of a metadata of said subgroup of metadata is altered without altering associated text object of said sub-group of text objects, in response to said retrieving said sub-group of text objects; and collating the organized sub-group of text objects thereby producing an electronic book; and downloading said electronic book to said remote computing device via a communication path.

16. The system of claim 15 wherein said server organizes said sub-group of text objects to provide contextualization using metadata of said plurality of metadata, said metadata associated with said sub-group of text objects.

17. The system of claim 15 wherein a text object of said plurality of text objects is a sentence, a task, or a concept.

18. The system of claim 15 wherein a text object of said plurality of text objects is a paragraph, an introduction, or a procedure.

19. The system of claim 15 wherein said database of information comprises an extensible Markup Language (XML) file.

20. The system of claim 15 wherein said plurality of text objects ore organized using a document type definition.

21. The system of claim 15 wherein said electronic book consists of a format selected from a Portable Document Format (PDF) and a Hypertext Markup Language (HTML).

22. A computer implemented system comprising:

means for establishing a database of information to include a plurality of predefined pieces of information and a plurality of metadata associated with said plurality of predefined pieces of information, wherein said plurality of metadata are associated with said plurality of predefined pieces of information via a plurality of identifiers;

means for receiving a search query associated with said database;

means for retrieving a sub-group of predefined pieces of information from said plurality of predefined pieces of information using said plurality of metadata and said search query, in response to receiving said search query;

means for organizing said sub-group of predefined pieces of information, using metadata associated with said sub-group of predefined pieces of information from said plurality of metadata, wherein said metadata associated with said sub-group of predefined pieces of information describes contextual relationships between said sub-group of predefined pieces of information, and wherein the content of a metadata of said metadata associated with said sub-group of predefined pieces of information is altered without altering associated predefined piece of information of said sub-group predefined pieces of information, in response to retrieving said sub-group of predefined pieces of information; and means for rendering the organized sub-group of predefined pieces of information thereby producing a virtual binder.

23. The system of claim 22 wherein a predefined piece of information of said plurality of predefined pieces of information is a sentence, a paragraph, or an introduction.

24. The system of claim 22 wherein a predefined piece of information of said plurality of predefined pieces of information is a task, a procedure, or a concept.

25. The system of claim 22 wherein said database comprises an extensible Markup Language (XML) file.

26. The system of claim 22 wherein said plurality of predefined pieces of information are organized using a document type definition.

27. The system of claim 22 wherein said virtual binder consists of a format selected from a Portable Document Format (PDF) and a Hypertext Markup Language (HTML).

* * * * *